(12) United States Patent
Trivedi

(10) Patent No.: US 11,454,535 B2
(45) Date of Patent: Sep. 27, 2022

(54) SMART MATERIAL TRACKING

(71) Applicant: Nirali Trivedi, Parsippany, NJ (US)

(72) Inventor: Nirali Trivedi, Parsippany, NJ (US)

( * ) Notice: Subject to any disclaimer, the term of this patent is extended or adjusted under 35 U.S.C. 154(b) by 47 days.

(21) Appl. No.: 16/730,909

(22) Filed: Dec. 30, 2019

(65) Prior Publication Data

US 2020/0209051 A1 Jul. 2, 2020

Related U.S. Application Data

(60) Provisional application No. 62/787,557, filed on Jan. 2, 2019.

(51) Int. Cl.
| | |
|---|---|
| *G01G 19/40* | (2006.01) |
| *G06F 3/14* | (2006.01) |
| *G01C 9/02* | (2006.01) |
| *G01G 23/37* | (2006.01) |
| *G01G 17/04* | (2006.01) |

(52) U.S. Cl.
CPC .......... *G01G 19/40* (2013.01); *G01C 9/02* (2013.01); *G01G 17/04* (2013.01); *G01G 23/37* (2013.01); *G06F 3/14* (2013.01)

(58) Field of Classification Search
CPC .... G01G 19/40; G01G 19/1952–19/60; G01G 21/28; G01G 23/37; G01C 9/02; G06F 3/14
See application file for complete search history.

(56) References Cited

U.S. PATENT DOCUMENTS

| | | | |
|---|---|---|---|
| 4,904,878 A | 2/1990 | Gipp et al. | |
| 5,014,798 A * | 5/1991 | Glynn | G01G 11/006 |
| | | | 177/132 |
| 5,184,510 A | 2/1993 | Rossman | |
| 5,641,947 A * | 6/1997 | Riddle, Jr. | B65F 1/06 |
| | | | 177/124 |
| 5,881,597 A | 3/1999 | Brooks | |

(Continued)

OTHER PUBLICATIONS https://hidratespark.com/

(Continued)

*Primary Examiner* — Randy W Gibson

(57) ABSTRACT

Apparatus and associated methods relate to tracking material based on configuring a container with a sensor adapted to measure the quantity of a material in the container, configuring a display to visually present as a function of time the material quantity relative to a predetermined threshold, determining the material quantity change within a predetermined time period based on captured sensor data, and automatically presenting in the display the material quantity performance displayed as a function of time based on the material quantity change and the predetermined threshold. In an illustrative example, the material may be water, and the container may be a bottle. The threshold may be a consumption performance goal. In various implementations, the container may be luggage, and the threshold may be an accumulation performance goal based on a weight limit. In some examples, the luggage may be, for example, a purse, tote, backpack, or lunchbox. Various embodiments may advantageously display consumption performance as a function of time, relative to a consumption goal.

20 Claims, 12 Drawing Sheets

(56) References Cited

U.S. PATENT DOCUMENTS

| | | | |
|---|---|---|---|
| 5,896,990 A | 4/1999 | Barzana | |
| 6,943,566 B2 | 9/2005 | Florin et al. | |
| 8,218,514 B2 | 7/2012 | Twitchell, Jr. | |
| 8,716,610 B2* | 5/2014 | Zyman Beer | G01G 19/58 177/148 |
| 8,717,163 B2 | 5/2014 | Easley et al. | |
| 8,829,365 B1* | 9/2014 | Wallace | G01G 19/4144 177/25.13 |
| 8,944,249 B1* | 2/2015 | Mullaney | G01G 23/206 206/459.1 |
| 9,347,821 B1* | 5/2016 | Mullaney | B65F 1/16 |
| 9,645,007 B2* | 5/2017 | Wallace | G01G 19/00 |
| 9,770,084 B1* | 9/2017 | Shiekh | A45C 15/00 |
| 9,772,217 B2* | 9/2017 | Wallace | G01G 19/00 |
| D815,892 S | 4/2018 | Nguyen et al. | |
| 10,035,647 B1* | 7/2018 | Rodoni | B65F 1/002 |
| 10,139,211 B1* | 11/2018 | Tillinghast | G01G 19/42 |
| 2005/0051586 A1* | 3/2005 | Siwak | A45C 13/28 224/576 |
| 2005/0217903 A1* | 10/2005 | Roberts | G01G 19/58 177/245 |
| 2006/0054364 A1* | 3/2006 | Kamakau | G01G 19/58 177/180 |
| 2007/0056779 A1* | 3/2007 | Laniado | E04H 4/06 177/245 |
| 2007/0186515 A1* | 8/2007 | Ruetten | G07G 1/0036 53/502 |
| 2008/0011568 A1* | 1/2008 | Siwak | G01G 19/58 190/115 |
| 2013/0275075 A1 | 10/2013 | Johnson | |
| 2014/0246255 A1* | 9/2014 | Semeniuta | G01G 19/40 177/1 |
| 2015/0108026 A1 | 4/2015 | Azimi et al. | |
| 2015/0122688 A1 | 5/2015 | Dias et al. | |
| 2016/0015602 A1* | 1/2016 | Panzini | G16H 20/10 340/666 |
| 2016/0022209 A1 | 1/2016 | Fraisl | |
| 2016/0110975 A1 | 4/2016 | Oppenheimer | |
| 2016/0324726 A1* | 11/2016 | Roberts | A61J 7/02 |
| 2016/0340119 A1* | 11/2016 | Mullaney | B65F 1/16 |
| 2017/0219416 A1* | 8/2017 | Kumar | G01G 19/4146 |
| 2017/0340147 A1 | 11/2017 | Hambrock et al. | |
| 2018/0216989 A1* | 8/2018 | Servin | G01G 21/22 |
| 2018/0297747 A1* | 10/2018 | Lee | A47G 19/2205 |
| 2019/0279168 A1* | 9/2019 | Lardner | G01G 19/021 |

OTHER PUBLICATIONS https://www.bellabeat.com/products/spring
https://myequa.com/products/equa-smart-water-bottle-dark-grey
http://www.silicone-kitchenutensils.com/sale-10130931-bpa-free-colorful-glass-silicone-water-bottle-with-leak-proof-twist-off-lid.html
https://support.bellabeat.com/hc/en-us/articles/115005276049-Tracking
https://www.adafruit.com/category/50.

* cited by examiner

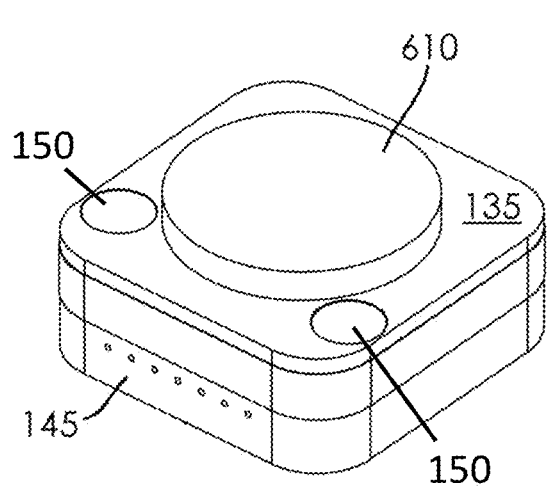
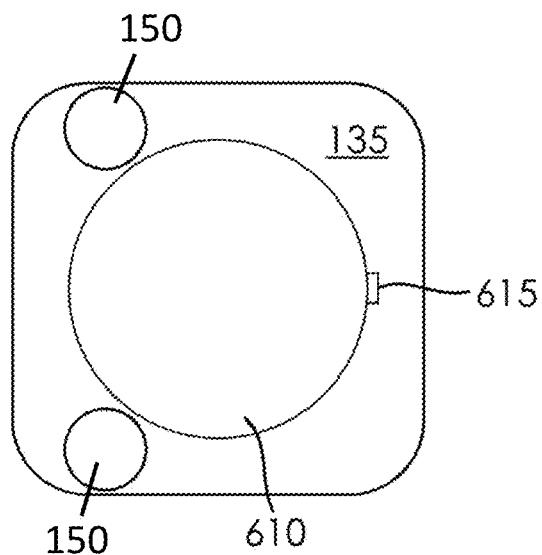
FIG. 7A
FIG. 7B
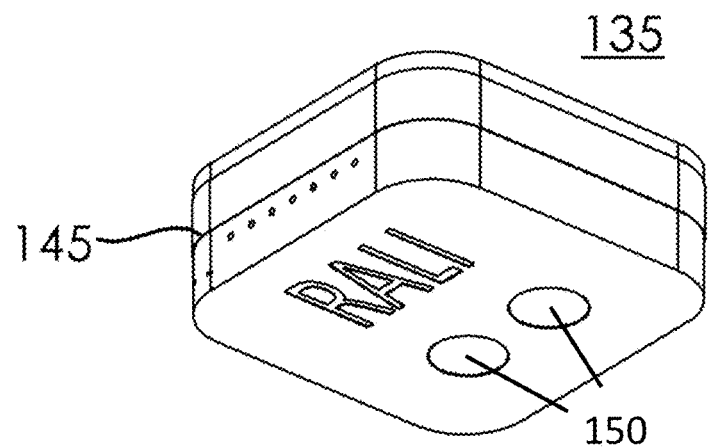
FIG. 7C

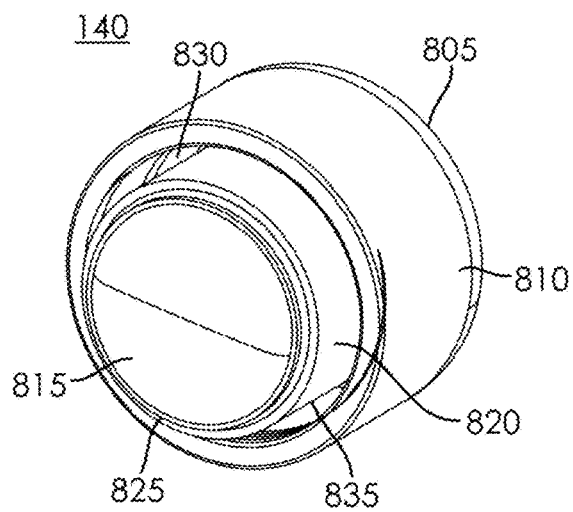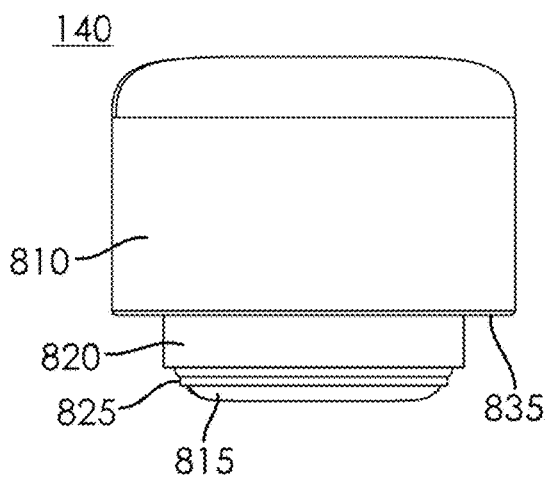
FIG. 8A  FIG. 8B
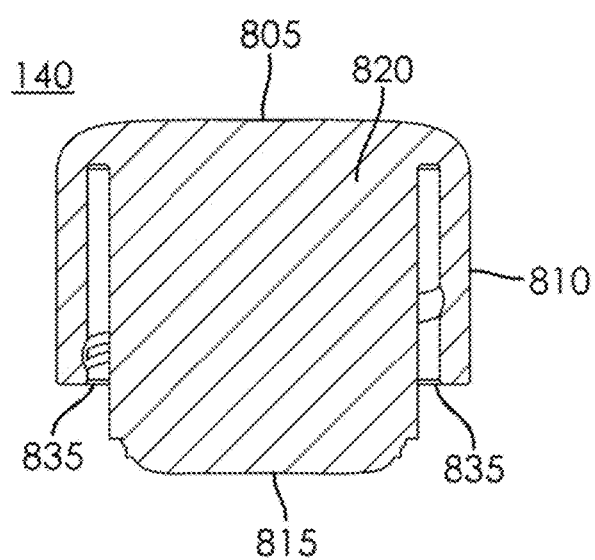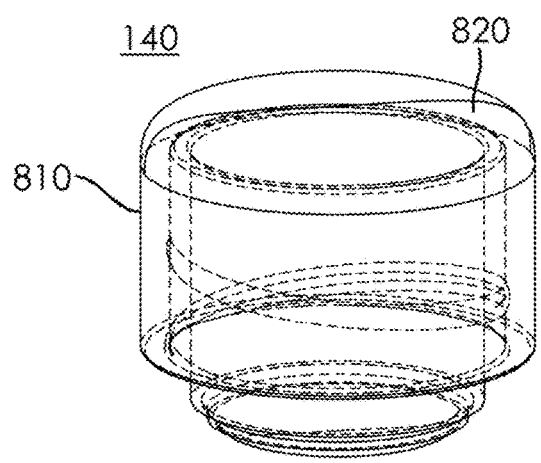
FIG. 8C  FIG. 8D

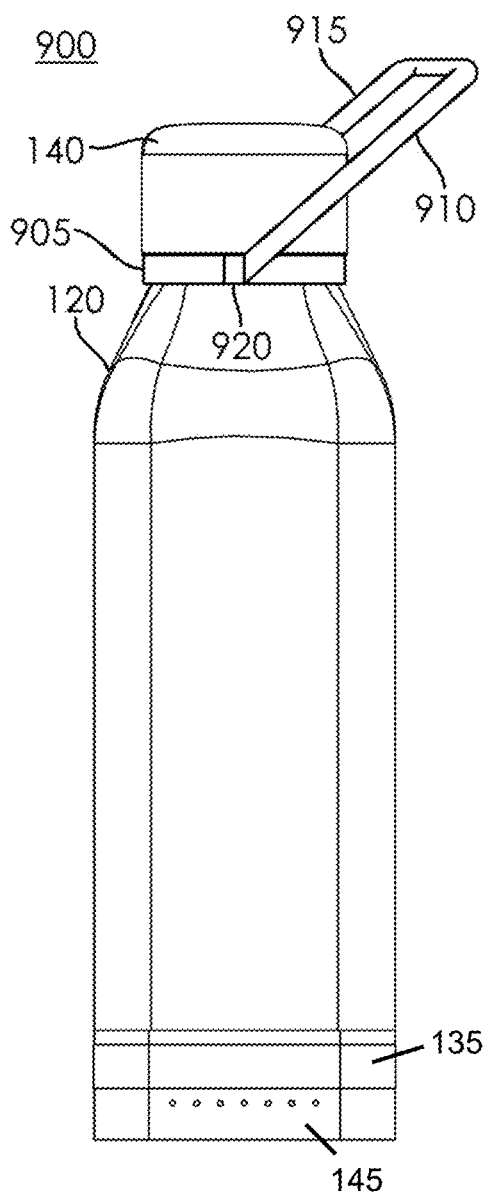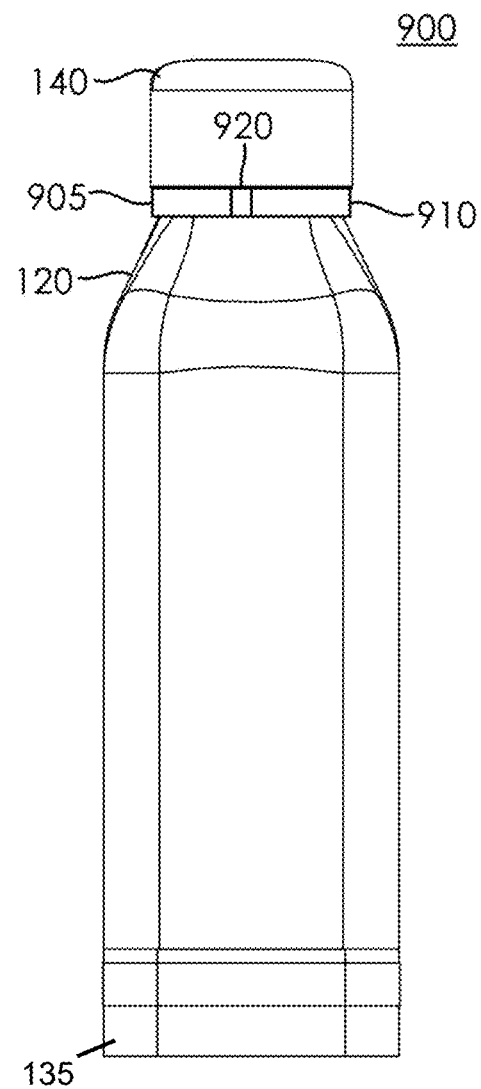
FIG. 9A
FIG. 9B

SMART MATERIAL TRACKING

CROSS-REFERENCE TO RELATED APPLICATIONS

This application claims the benefit of U.S. Provisional Patent Application No. 62/787,557, titled "Water bottle that tracks hydration levels and reminds user to drink water," Inventor: Nirali Trivedi, filed by Applicant: Nirali Trivedi, on Jan. 2, 2019.

This application incorporates the entire disclosure of the above-referenced application herein by reference.

TECHNICAL FIELD

Various embodiments relate generally to material tracking.

BACKGROUND

A container is a receptacle. Some containers may retain material for human use. In various examples, a user may consume material from a container. For example, a container may be a water bottle. In some scenarios, a user may have a consumption goal to consume a predetermined quantity of water within a specified period of time. For example, a user may have a desire to maintain hydration, based on a fluid consumption rate determined as a function of ambient temperature or activity level.

In some examples, a container may be luggage. Luggage may be, for example, a purse, tote, backpack, or lunchbox. Some luggage may be subject to a weight limit. In an illustrative example, exceeding a luggage weight limit may increase transportation cost. In various scenarios, a luggage user may have an accumulation goal to avoid adding material to the luggage in excess of a transportation weight limit. For example, a user may limit accumulation of items in the luggage, based on the luggage weight and a weight limitation.

In various exemplary scenarios, consumption or accumulation goals may change with time. For example, a transportation weight limit may vary over time based on available transportation vehicle capacity. Some consumption goals may change with time, as a result of varying weather conditions and activity levels. In an illustrative example, a user seeking to maintain hydration may expend significant time and effort adjusting fluid intake to reach their consumption goal.

SUMMARY

Apparatus and associated methods relate to tracking material based on configuring a container with a sensor adapted to measure the quantity of a material in the container, configuring a display to visually present as a function of time the material quantity relative to a predetermined threshold, determining the material quantity change within a predetermined time period based on captured sensor data, and automatically presenting in the display the material quantity performance displayed as a function of time based on the material quantity change and the predetermined threshold. In an illustrative example, the material may be water, and the container may be a bottle. The threshold may be a consumption performance goal. In various implementations, the container may be luggage, and the threshold may be an accumulation performance goal based on a weight limit. Various embodiments may advantageously display consumption performance as a function of time, relative to a consumption goal.

Various embodiments may achieve one or more advantages. For example, some embodiments may improve a user's ease of maintaining adequate hydration. This facilitation may be a result of reducing the user's effort adjusting their fluid intake rate and replenishing fluid in the user's water bottle. In some embodiments, measured consumption relative to a predetermined consumption goal may be automatically displayed as a function of time on a user's water bottle. Such automatic visual presentation of a user's material consumption quantity performance with respect to time may reduce a user's exposure to inadequate hydration levels and insufficient fluid inventory. Some embodiments may track material quantity related to a user's luggage carrying accumulated items subject to a transportation weight limit, reminding the user to avoid adding items that may exceed the weight limit. Such accumulation quantity performance tracking of items added to luggage may improve the user's travel experience. For example, a traveler reminded of their material accumulation quantity performance may adjust their accumulation more quickly, reducing the user's exposure to increased transportation cost that may result from excess luggage weight.

In some embodiments, the effort required by a user to adjust consumption to the user's hydration requirements may be reduced. For example, a user who exercises outdoors may require increased consumption to maintain hydration on a hot day, and some embodiments may automatically remind the user to increase their consumption rate to maintain hydration in response to a quantity consumption performance deficit relative to a quantity performance goal in a period of time with elevated temperature. Other embodiments include maintaining consumption for users, such as the elderly, pregnant women, young children, and babies. In some embodiments, the container with consumption metrics could be used to track food consumption from the container. Some embodiments may improve the overall hydration levels and exercise recovery times for group. This facilitation may be a result of containers electronically identifiable as members of a group, and tracking the group hydration levels based on a group profile consolidating each group member's consumption quantity performance. For example, a group of athletes with varying hydration requirements based on their training programs may receive different reminders, or various supplements, determined as a function of individual consumption quantity performance relative to an individualized quantity performance goal, allowing a trainer to customize a hydration or supplementation plan adjusted to each group member's athletic performance goals. In some embodiments, such group performance may be used by an enterprise or corporation for employee wellness. In an illustrative example, other embodiment functions may be based on user body composition. For example, fluid consumption rate may be influenced by a user's body metrics, such as height, or weight.

The details of various embodiments are set forth in the accompanying drawings and the description below. Other features and advantages will be apparent from the description and drawings, and from the claims.

BRIEF DESCRIPTION OF THE DRAWINGS

FIGS. 7A-7C together depict various illustrative views of an exemplary material tracking system base.

FIGS. 8A-8D together depict various illustrative views of an exemplary material tracking system container cap.

FIGS. 9A-9B together depict illustrative side views of an exemplary material tracking system container handle.

Like reference symbols in the various drawings indicate like elements.

DETAILED DESCRIPTION OF ILLUSTRATIVE EMBODIMENTS

Figure 4:
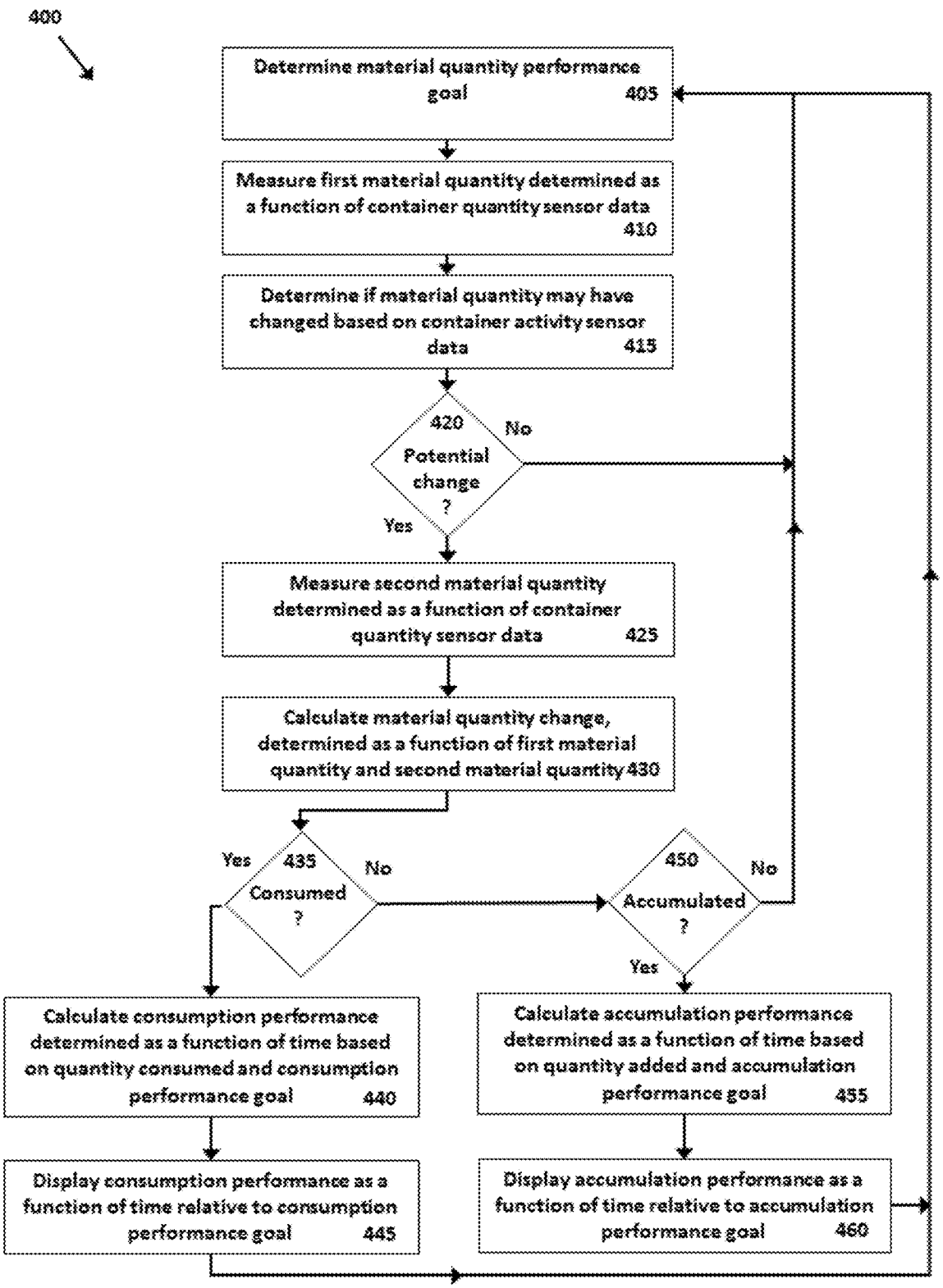
FIG. 4 depicts an illustrative process flow of an embodiment MTE (Material Tracking Engine) tracking material quantity performance as a function of time in exemplary consumption and accumulation tracking scenarios.
Figure 5:
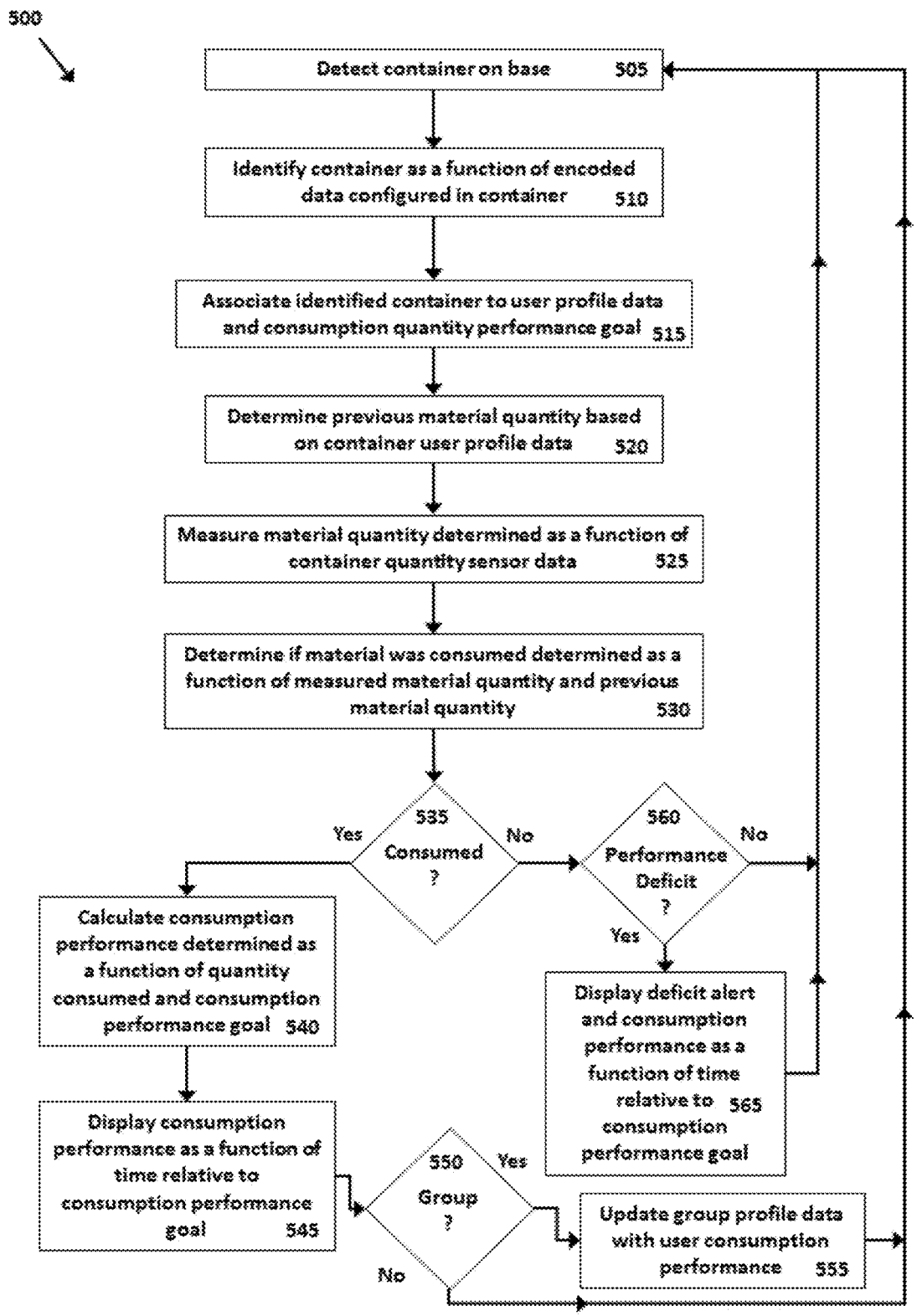
FIG. 5 depicts an illustrative process flow of an embodiment MTE (Material Tracking Engine) tracking material consumption quantity performance as a function of time in an exemplary group consumption performance tracking scenario.

To aid understanding, this document is organized as follows. First, tracking material quantity performance as a function of time in exemplary consumption and accumulation tracking scenarios is briefly introduced with reference to FIG. 1. Second, with reference to FIGS. 2-3, the discussion turns to exemplary embodiments that illustrate various material tracking system implementations. Specifically, embodiment material tracking network and material tracking device designs are disclosed. Third, with reference to FIGS. 4-5, illustrative process flows of an exemplary Material Tracking Engine (MTE) are described. Fourth, with reference to FIGS. 6-9, embodiment material tracking system container, base, cap, and handle component implementations are disclosed. Finally, with reference to FIG. 10, exemplary design of an embodiment material tracking system display is presented to explain improvements in material tracking technology.

Figure 1:
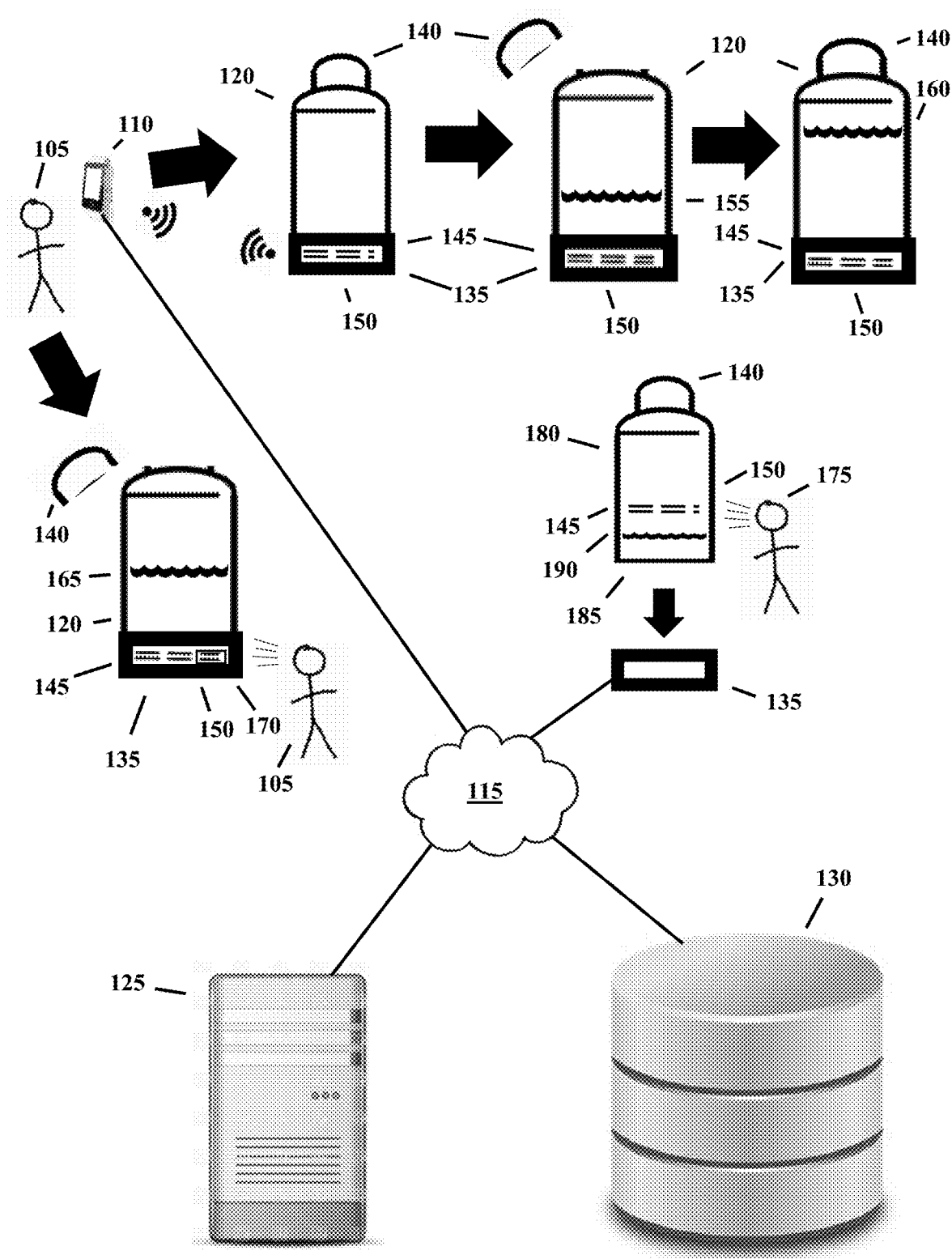
FIG. 1 depicts an illustrative operational scenario tracking material based on configuring a container with a sensor adapted to measure the quantity of a material in the container, configuring a display to visually present as a function of time the material quantity relative to a predetermined threshold, determining the material quantity change within a predetermined time period based on captured sensor data, and automatically presenting in the display the material quantity performance displayed as a function of time based on the material quantity change and the predetermined threshold.

FIG. 1 depicts an illustrative operational scenario tracking material based on configuring a container with a sensor adapted to measure the quantity of a material in the container, configuring a display to visually present as a function of time the material quantity relative to a predetermined threshold, determining the material quantity change within a predetermined time period based on captured sensor data, and automatically presenting in the display the material quantity performance displayed as a function of time based on the material quantity change and the predetermined threshold. In the example depicted by FIG. 1, the user 105 employs the mobile device 110 via the network cloud 115 to track material quantity performance in the depicted material tracking system. In the illustrated example, the exemplary material tracking system includes the container 120. In the illustrated example, the user 105 has a consumption goal to consume a predetermined quantity of material from the container 120 within a set period of time. For example, in the depicted embodiment the container 120 is a water bottle, and the user 105 has a consumption goal to consume a predetermined quantity of water within a set time period, to maintain adequate hydration. In an illustrative example, the quantity consumed relative to the user's consumption goal may be referred to as the user's consumption quantity performance, and the consumption goal may be determined as a function of a threshold quantity. Various embodiment implementations may determine consumption quantity performance as the ratio of measured amount consumed to a consumption goal. In various examples, a user's consumption performance may be ahead of, or behind, the user's consumption goal at any time. In some embodiments, the predetermined material quantity performance goal may be an accumulation goal. In an illustrative example, a user's accumulation goal may be an amount of material the user may accumulate relative to a predetermined weight limit. Some embodiments may determine accumulation quantity performance as the ratio of measured amount accumulated to an accumulation limit. For example, in some designs, the container 120 may be luggage, and an accumulation goal may track the weight of a traveling user's luggage container 120 relative to a transportation weight limit, as the user accumulates items in the luggage while traveling. In some examples, a user's accumulation performance may be ahead of, or behind, the user's accumulation goal at any time. Various embodiments may advantageously track a user's quantity performance in multiple time periods of a longer period of time, for each time period displaying on the container a visual indication of the degree to which performance is ahead of or behind goals.

In the depicted example, the container 120 is a water bottle operably and communicatively coupled via the network cloud 115 with the material tracking server 125 and the material tracking database 130 by the material tracking system base 135. In the illustrated example, the material tracking database 135 provides retrievable storage for material quantity performance data, user profile data, and consumption quantity goals. In the illustrated example, the exemplary material tracking system includes the cap 140 configured to releasably secure material retained within the container 120. In the depicted example, the base 135 includes a processor configured to measure the material quantity retained by the container 120. In the illustrated embodiment, the material quantity retained by the container 120 is measured by a weight sensor configured in the base 135. In some embodiments, the material quantity retained by the container 120 may be measured by a level sensor.

In the depicted embodiment, the base includes display 145 configured to visually present as a function of time material quantity change relative to a predetermined material quantity performance goal. In the illustrated embodiment, the base 135 includes the controls 150 configured with buttons adapted to permit a user to configure and activate various features of the exemplary material tracking system. In the illustrated embodiment, the display 145 includes a lighting element array configured in the base 135. In some embodiment material tracking system implementations, the display 145 may include a multiple dot display configured to visually present a user's consumption performance based on selectively illuminating each dot of the display 145 multiple dot display as a metrics display. In some embodiments, the display 145 lighting element array may be configured in the container 120. In the depicted embodiment, the mobile device 110 is operably and communicatively coupled via the depicted wireless link with the material tracking system base 135. In the illustrated embodiment, the wireless link coupling the mobile device 110 with the material tracking system base 135 is a Bluetooth® link. In some embodiments, the mobile device 110 may be configured with a mobile app adapted to operate the material tracking system.

In the depicted example, the user 105 begins tracking material consumption with the material tracking system measuring the first material quantity 155 retained within the container 120. In the illustrated example, the material tracking system retrieves the user 105 consumption goal from the material tracking database 130. In the depicted example, while the user 105 fills the container 120, the material tracking system flashes the display 145. In the illustrated example, the material tracking system flashes the display 145 to indicate the user 105 should continue to fill the container 120 to the quantity needed to reach the user 105 consumption goal. In the depicted example, when the user 105 fills the container 120 to the second material quantity 160, the material tracking system stops flashing the display 145, to indicate the material quantity in the container 120 is adequate to reach the user 105 consumption goal. In the illustrated example, the user 105 consumes the material from the container 120, resulting in third material quantity 165 during an exemplary user 105 material tracking period. In the depicted example, the user 105 places the container 120 in the base 135, and the material tracking system determines the user 105 material quantity consumption performance based on comparing the measured third material quantity 165 with the measured second material quantity 160. In the depicted example, the material tracking system determines the user 105 material quantity consumption performance is inadequate, relative to the user 105 consumption goal. In the illustrated example, the material tracking system activates the visibly displayed alert 170 in the display 145 to notify the user 105 of the inadequate consumption. In some embodiments, the material tracking system may send an alert to the user 105 via the mobile app configured in the mobile device 110. In the depicted example, the material tracking system is also tracking consumption of the second user 175. In the illustrated example, the second user 175 places the second water bottle 180 on the base 135. In the depicted example, the base 135 is configured to sense encoded data identifying a container placed on the base. In the illustrated example, the water bottle 180 is configured with water bottle identification means 185 including encoded data identifying the water bottle 180. In the depicted embodiment, the encoded data identifying the water bottle 180 is accessible to the base 135 when the water bottle 180 is placed on the base 135. In the depicted example, the material tracking system identifies the water bottle 180 based on the water bottle identification means 185. In the illustrated example, the material tracking system associates the water bottle 180 with the second user 175 material quantity consumption goal retrieved from the material tracking database 130. In the depicted example, the material tracking system measures the quantity of water in the water bottle 180 as a function of the material weight based on the fourth water level 190. In the illustrated embodiment, the material tracking system determines the second user 175 material quantity consumption performance is on track with the second user 175 consumption goal, and the material tracking system activates the display 145 to present steady colored lights indicating adequate second user 175 consumption performance.

In an illustrative example, the display 145 lighting element array may be a strip of lighting elements in which each lighting element's illumination is controllable by the processor to present a visually distinct indication based on generating a unique color, pattern, or intensity combination activated by the processor. In the depicted embodiment, each lighting element of the display 145 lighting element array is illuminated to visually present as a function of time the user's measured water consumption relative to the user's water consumption goal in one time period. In an example illustrative of various embodiments' design and usage, the user's material consumption quantity performance over an eight-hour day may be visually presented by four lighting elements configured in the display 145, wherein each lighting element may represent a two-hour period of the eight hour day. For example, during the third two-hour consumption tracking period of an eight-hour day, the user may have been far behind the consumption goal in the first two-hour consumption tracking period, and the lighting element configured to present the user's material consumption quantity performance in the first two-hour period may flash bright red indicating a severe deficit during that historical time period. Continuing this illustrative example, the user may have increased consumption during the second time period without catching up to the consumption goal, and the lighting element configured to present the user's material consumption quantity performance in the second two-hour period may be steady yellow indicating a moderate deficit during that historical time period. In the third and current two-hour time period, the user may have caught up to the consumption goal as of the current time, and the lighting element configured to present the user's material consumption quantity performance in the current period may flash green, indicating that although the consumption performance relative to the consumption goal is adequate as of the present time, the current two-hour period is not complete, and the consumption quantity performance determination is ongoing for the current period.

Figure 2:
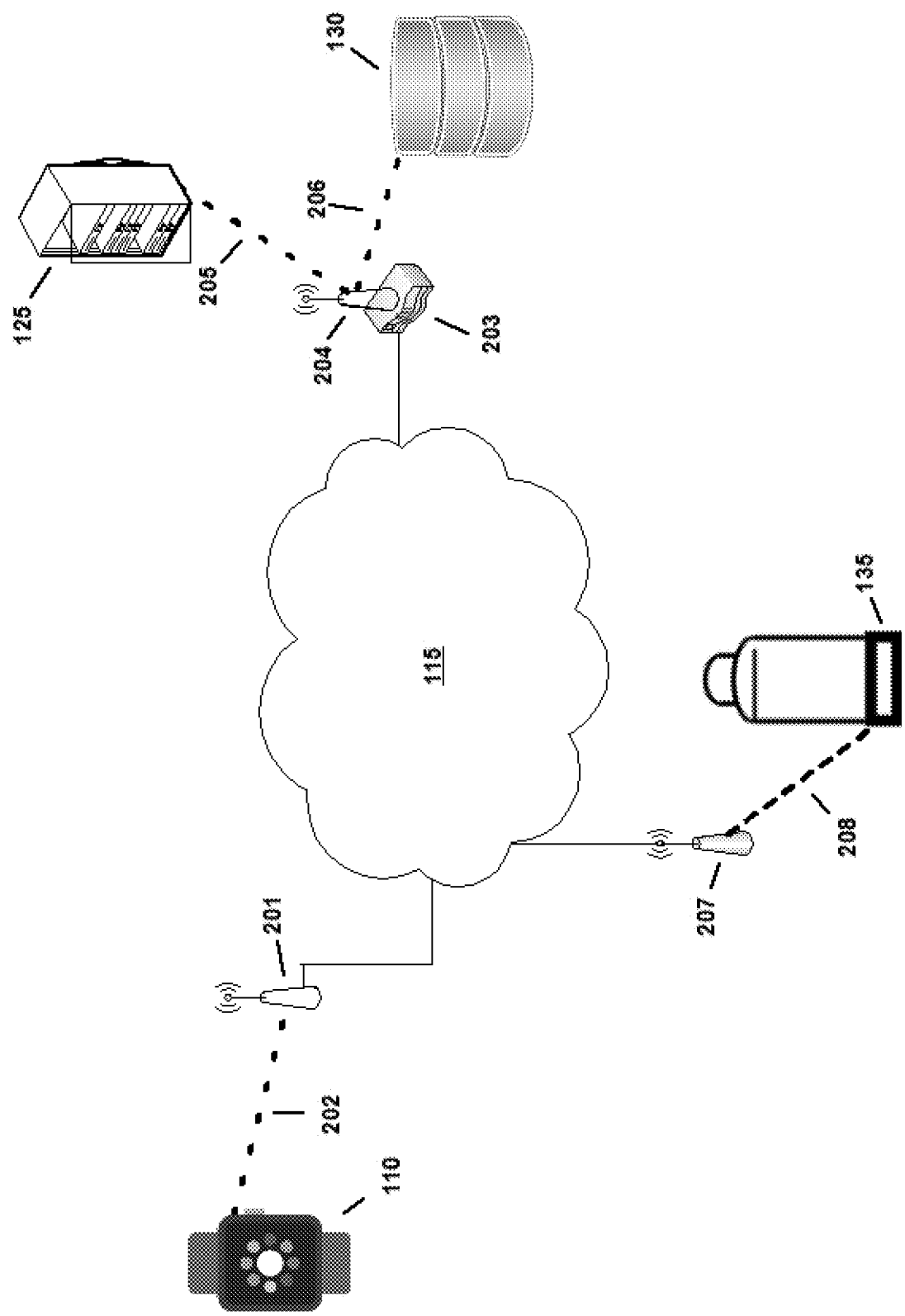
FIG. 2 depicts a schematic view of an exemplary material tracking network.

FIG. 2 depicts a schematic view of an exemplary material tracking network. In FIG. 2, according to an exemplary embodiment of the present disclosure, data may be transferred to the system, stored by the system and/or transferred by the system to users of the system across local area networks (LANs) or wide area networks (WANs). In accordance with various embodiments, the system may include numerous servers, data mining hardware, computing devices, or any combination thereof, communicatively connected across one or more LANs and/or WANs. One of ordinary skill in the art would appreciate that there are numerous manners in which the system could be configured, and embodiments of the present disclosure are contemplated for use with any configuration. Referring to FIG. 2, a schematic overview of a system in accordance with an embodiment of the present disclosure is shown. In the depicted embodiment, an exemplary system includes the exemplary mobile device 110. In the illustrated example, the mobile device 110 is a smartwatch configured to control and monitor an embodiment material tracking system. In the illustrated embodiment, the material tracking server 125 is a computing device configured to provide user account, activation, and material tracking support services to a network of embodiment material tracking systems. In the depicted embodiment, the material tracking database 130 is a network storage device providing retrievable storage to material quantity performance goals, quantity performance measurements, and material tracking system user account profiles. In the depicted example, the exemplary material tracking system base 135 includes a computing device configured to track material retained within a container placed on the material tracking system base 135. In the illustrated embodiment, the mobile device 110 is communicatively and operably coupled by the wireless access point 201 and the wireless link 202 with the network cloud 115 (for example, the Internet) to send, retrieve, or manipulate information in storage devices, servers, and network components, and exchange information with various other systems and devices via the network cloud 115. In the depicted example, the illustrative system includes the router 203 configured to communicatively and operably couple the material tracking server 125 to the network cloud 115 via the wireless access point 204 and the wireless communication link 205. In the illustrated example, the router 203 also communicatively and operably couples the material tracking database 130 to the network cloud 115 via the wireless access point 204 and the wireless communication link 206. In the depicted embodiment, the material tracking system base 135 is communicatively and operably coupled with the network cloud 115 by the wireless access point 207 and the wireless communication link 208. In various examples, one or more of: the mobile device 110, the material tracking server 125, the material tracking database 130, or the material tracking system base 135 may include an application server configured to store or provide access to information used by the system. In various embodiments, one or more application server may retrieve or manipulate information in storage devices and exchange information through the network cloud 115. In some examples, one or more of: the mobile device 110, the material tracking server 125, the material tracking database 130, or the material tracking system base 135 may include various applications implemented as processor-executable program instructions. In some embodiments, various processor-executable program instruction applications may also be used to manipulate information stored remotely and process and analyze data stored remotely across the network cloud 115 (for example, the Internet). According to an exemplary embodiment, as shown in FIG. 2, exchange of information through the network cloud 115 or other network may occur through one or more high speed connections. In some cases, high speed connections may be over-the-air (OTA), passed through networked systems, directly connected to one or more network cloud 115 or directed through one or more router. In various implementations, one or more router may be optional, and other embodiments in accordance with the present disclosure may or may not utilize one or more router. One of ordinary skill in the art would appreciate that there are numerous ways any or all of the depicted devices may connect with the network cloud 115 for the exchange of information, and embodiments of the present disclosure are contemplated for use with any method for connecting to networks for the purpose of exchanging information. Further, while this application may refer to high speed connections, embodiments of the present disclosure may be utilized with connections of any useful speed. In an illustrative example, components or modules of the system may connect to one or more of: the mobile device 110, the material tracking server 125, the material tracking database 130, or the material tracking system base 135 via the network cloud 115 or other network in numerous ways. For instance, a component or module may connect to the system i) through a computing device directly connected to the network cloud 115, ii) through a computing device connected to the network cloud 115 through a routing device, or iii) through a computing device connected to a wireless access point. One of ordinary skill in the art will appreciate that there are numerous ways that a component or module may connect to a device via network cloud 115 or other network, and embodiments of the present disclosure are contemplated for use with any network connection method. In various examples, one or more of: the mobile device 110, the material tracking server 125, the material tracking database 130, or the material tracking system base 135 could include a personal computing device, such as a smartphone, tablet computer, wearable computing device, cloud-based computing device, virtual computing device, or desktop computing device, configured to operate as a host for other computing devices to connect to. In some examples, one or more communications means of the system may be any circuitry or other means for communicating data over one or more networks or to one or more peripheral devices attached to the system, or to a system module or component. Appropriate communications means may include, but are not limited to, wireless connections, wired connections, cellular connections, data port connections, Bluetooth® connections, near field communications (NFC) connections, or any combination thereof. One of ordinary skill in the art will appreciate that there are numerous communications means that may be utilized with embodiments of the present disclosure, and embodiments of the present disclosure are contemplated for use with any communications means.

Figure 3:
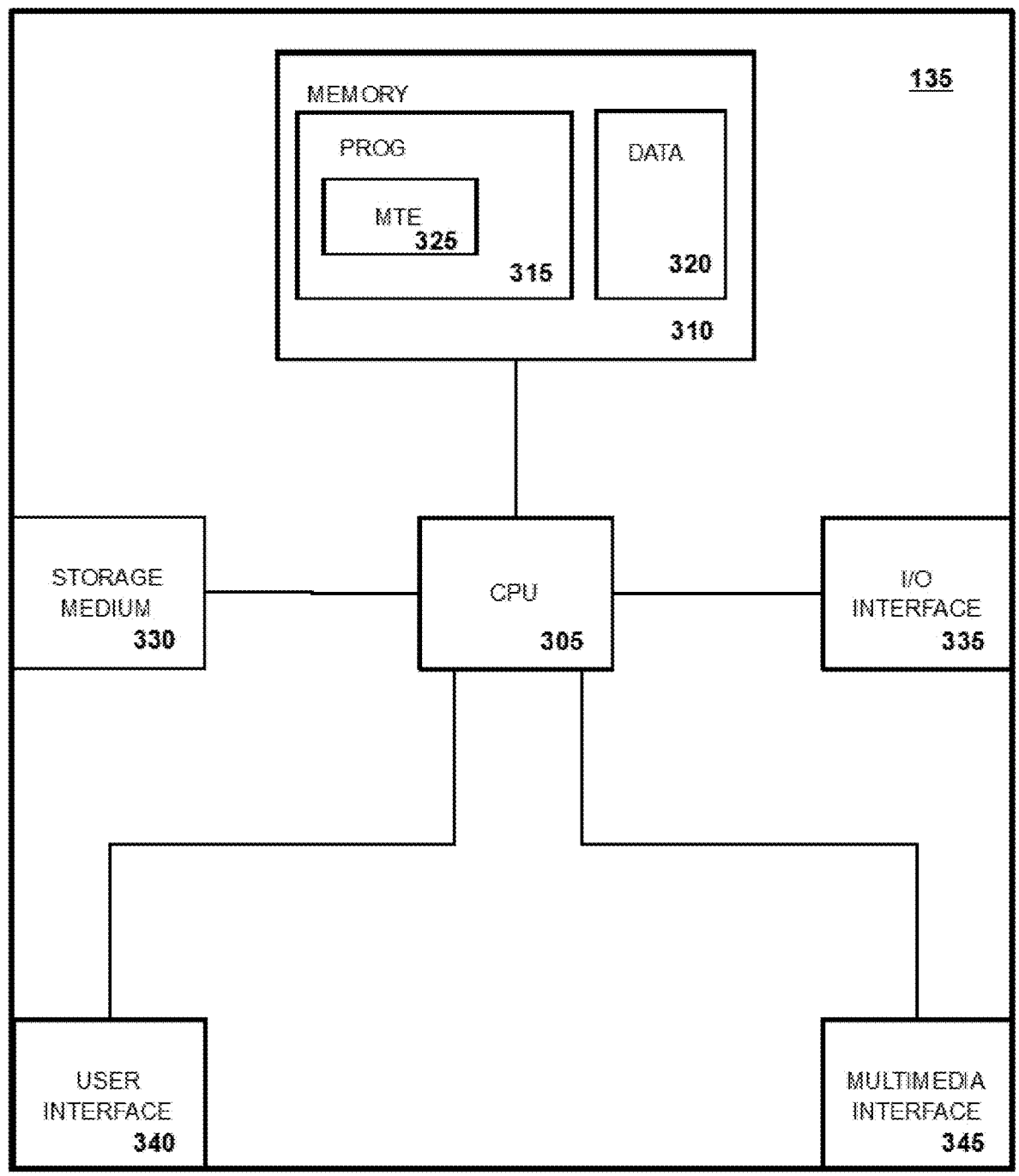
FIG. 3 depicts a structural view of an exemplary computing device adapted with an MTE (Material Tracking Engine) configured to track material.

FIG. 3 depicts a structural view of an exemplary computing device adapted with an MTE (Material Tracking Engine) configured to track material. In FIG. 3, the block diagram of the exemplary material tracking system base 135 includes processor 305 and memory 310. The processor 305 is in electrical communication with the memory 310. The depicted memory 310 includes program memory 315 and data memory 320. The depicted program memory 315 includes processor-executable program instructions implementing the MTE (Material Tracking Engine) 325. In various embodiment designs, a functional equivalent to the material tracking system base 135 disclosed with reference to FIG. 3 may be implemented in other component parts of an exemplary material tracking system, including, for example, in a container, or a cap. In some embodiments, the illustrated program memory 315 may include processor-executable program instructions configured to implement an OS (Operating System). In various embodiments, the OS may include processor executable program instructions configured to implement various operations when executed by the processor 305. In some embodiments, the OS may be omitted. In some embodiments, the illustrated program memory 315 may include processor-executable program instructions configured to implement various Application Software. In various embodiments, the Application Software may include processor executable program instructions configured to implement various operations when executed by the processor 305. In some embodiments, the Application Software may be omitted. In the depicted embodiment, the processor 305 is communicatively and operably coupled with the storage medium 330. In the depicted embodiment, the processor 305 is communicatively and operably coupled with the I/O (Input/Output) interface 335. In the depicted embodiment, the I/O interface 335 includes a network interface. In various implementations, the network interface may be a wireless network interface. In some designs, the network interface may be a Wi-Fi interface. In some embodiments, the network interface may be a Bluetooth interface. In an illustrative example, the material tracking system base 135 may include more than one network interface. In some designs, the network interface may be a wireline interface. In some designs, the network interface may be omitted. Various I/O interface 335 implementations may include lighting element array control outputs adapted to drive a strip of lighting elements in which each lighting element's illumination is controllable by the processor 305 to present a visually distinct indication based on generating a unique color, pattern, or intensity combination activated by the processor 305. In the depicted embodiment, the processor 305 is communicatively and operably coupled with the user interface 340. In various implementations, the user interface 340 may be adapted to receive input from a user or send output to a user. In some embodiment implementations, the user interface 340 may include a vibration motor operably coupled with the processor 305 for control of the vibration intensity and vibration frequency of the vibration motor. In some embodiments, the user interface 340 may be adapted to an input-only or output-only user interface mode. In various implementations, the user interface 340 may include an imaging display. In some embodiments, the user interface 340 may include an audio interface. In some designs, the audio interface may include an audio input. In various designs, the audio interface may include an audio output. In some implementations, the user interface 340 may be touch-sensitive. In some designs, the material tracking system base 135 may include an accelerometer operably coupled with the processor 305. In various embodiments, the material tracking system base 135 may include a GPS module operably coupled with the processor 305. In an illustrative example, the material tracking system base 135 may include a magnetometer operably coupled with the processor 305. In some embodiments, the user interface 340 may include an input sensor array. In various implementations, the input sensor array may include one or more imaging sensor. In some designs, the input sensor array may include a weight sensor. Some input sensor array implementations may include a material level sensor. Various material level sensor designs may include a liquid level sensor. In various designs, the input sensor array may include one or more audio transducer. In some implementations, the input sensor array may include a radio-frequency detector. In an illustrative example, the input sensor array may include an ultrasonic audio transducer. In some embodiments, the input sensor array may include image sensing subsystems or modules configurable by the processor 305 to be adapted to provide image input capability, image output capability, image sampling, spectral image analysis, correlation, autocorrelation, Fourier transforms, image buffering, image filtering operations including adjusting frequency response and attenuation characteristics of spatial domain and frequency domain filters, image recognition, pattern recognition, or anomaly detection. In various implementations, the depicted memory 310 may contain processor executable program instruction modules configurable by the processor 305 to be adapted to provide image input capability, image output capability, image sampling, spectral image analysis, correlation, autocorrelation, Fourier transforms, image buffering, image filtering operations including adjusting frequency response and attenuation characteristics of spatial domain and frequency domain filters, image recognition, pattern recognition, or anomaly detection. In some embodiments, the input sensor array may include audio sensing subsystems or modules configurable by the processor 305 to be adapted to provide audio input capability, audio output capability, audio sampling, spectral audio analysis, correlation, autocorrelation, Fourier transforms, audio buffering, audio filtering operations including adjusting frequency response and attenuation characteristics of temporal domain and frequency domain filters, audio pattern recognition, or anomaly detection. In various implementations, the depicted memory 310 may contain processor executable program instruction modules configurable by the processor 305 to be adapted to provide audio input capability, audio output capability, audio sampling, spectral audio analysis, correlation, autocorrelation, Fourier transforms, audio buffering, audio filtering operations including adjusting frequency response and attenuation characteristics of temporal domain and frequency domain filters, audio pattern recognition, or anomaly detection. In the depicted embodiment, the processor 305 is communicatively and operably coupled with the multimedia interface 345. In the illustrated embodiment, the multimedia interface 345 includes interfaces adapted to input and output of audio, video, and image data. In some embodiments, the multimedia interface 345 may include one or more still image camera or video camera. In various designs, the multimedia interface 345 may include one or more microphone. In some implementations, the multimedia interface 345 may include a wireless communication means configured to operably and communicatively couple the multimedia interface 345 with a multimedia data source or sink external to the material tracking system base 135. In various designs, the multimedia interface 345 may include interfaces adapted to send, receive, or process encoded audio or video. In various embodiments, the multimedia interface 345 may include one or more video, image, or audio encoder. In various designs, the multimedia interface 345 may include one or more video, image, or audio decoder. In various implementations, the multimedia interface 345 may include interfaces adapted to send, receive, or process one or more multimedia stream. In various implementations, the multimedia interface 345 may include a GPU. In some embodiments, the multimedia interface 345 may be omitted. Useful examples of the illustrated material tracking system base 135 include, but are not limited to, personal computers, servers, tablet PCs, smartphones, or other computing devices. In some embodiments, multiple material tracking system base 135 devices may be operably linked to form a computer network in a manner as to distribute and share one or more resources, such as clustered computing devices and server banks/farms. Various examples of such general-purpose multi-unit computer networks suitable for embodiments of the disclosure, their typical configuration and many standardized communication links are well known to one skilled in the art, as explained in more detail in the foregoing FIG. 2 description. In some embodiments, an exemplary material tracking system base 135 design may be realized in a distributed implementation. In an illustrative example, some material tracking system base 135 designs may be partitioned between a client device, such as, for example, a phone, and, a more powerful server system, as depicted, for example, in FIG. 2. In various designs, a material tracking system base 135 partition hosted on a PC or mobile device may choose to delegate some parts of computation, such as, for example, machine learning or deep learning, to a host server. In some embodiments, a client device partition may delegate computation-intensive tasks to a host server to take advantage of a more powerful processor, or to offload excess work. In an illustrative example, some devices may be configured with a mobile chip including an engine adapted to implement specialized processing, such as, for example, neural networks, machine learning, artificial intelligence, image recognition, audio processing, or digital signal processing. In some embodiments, such an engine adapted to specialized processing may have sufficient processing power to implement some features. However, in some embodiments, an exemplary material tracking system base 135 may be configured to operate on a device with less processing power, such as, for example, various gaming consoles, which may not have sufficient processor power, or a suitable CPU architecture, to adequately support material tracking system base 135. Various embodiment designs configured to operate on a such a device with reduced processor power may work in conjunction with a more powerful server system.

FIG. 4 depicts an illustrative process flow of an embodiment MTE (Material Tracking Engine) tracking material quantity performance as a function of time in exemplary consumption and accumulation tracking scenarios. The method depicted in FIG. 4 is given from the perspective of the MTE 325 implemented via processor-executable program instructions executing on the material tracking system base 135 processor 305, depicted in FIG. 3. In the illustrated embodiment, the MTE 325 executes as program instructions on the processor 305 configured in the MTE 325 host material tracking system base 135, depicted in at least FIG. 1, FIG. 2, and FIG. 3. In some embodiments, the MTE 325 may execute as a cloud service communicatively and operatively coupled with system services, hardware resources, or software elements local to and/or external to the MTE 325 host material tracking system base 135. The depicted method 400 begins at step 405 with the processor 305 determining a material quantity performance goal. In various designs, the material quantity performance goal may be associated to a user through a database of user profiles including goals and performance measurements, permitting material tracking customized to the user by the processor 305. Then, the method continues at step 410 with the processor 305 measuring a first material quantity determined as a function of container quantity sensor data. In some implementations the processor 305 may determine material quantity based on a weight sensor integrated with the material tracking system base 135. In various embodiments, the processor 305 may determine material quantity based on a material level sensor integrated with a container component of a material tracking system. The method continues at step 415 with the processor 305 determining if the material quantity in the container may have changed, based on container activity sensor data. In various embodiment implementations, the container activity sensor may include accelerometer data indicative of container activity such as, for example, user consumption activity. At step 420 the processor 305 performs a test to determine if the material quantity in the container may have changed, based on the container activity sensor data. Upon a determination at step 420 by the processor 305 the material quantity in the container should not have changed, the method continues at step 405 with the processor 305 determining a material quantity performance goal. Upon a determination at step 420 by the processor 305 the material quantity in the container may have changed, the method continues at step 425 with the processor measuring a second material quantity determined as a function of the container quantity sensor data. Then, the method continues at step 430 with the processor 305 calculating the material quantity change, determined as a function of the first material quantity measured by the processor 305 at step 410, and the second material quantity measured by the processor 305 at step 425. At step 435 the processor 305 performs a test to determine if the material quantity change calculated by the processor 305 at step 430 was a material quantity consumption change. In an illustrative example, the processor 305 may determine a quantity change was a consumption change if the second material quantity was less than the first material quantity. Upon a determination at step 435 by the processor 305 the quantity change was not a consumption change, the method continues at step 450 with the processor 305 performing a test to determine if the material quantity change calculated by the processor 305 at step 430 was a material quantity accumulation change. In an illustrative example, the processor 305 may determine a quantity change was an accumulation change if the second material quantity was greater than the first material quantity. Upon a determination at step 450 by the processor 305 the quantity change was not an accumulation change, the method continues at step 405 with the processor 305 determining a material quantity performance goal. Upon a determination at step 435 by the processor 305 the quantity change was a consumption change, the method continues at step 440 with the processor 305 calculating consumption performance determined as a function of time based on quantity consumed and the consumption goal. Then, the method continues at step 445 with the processor 305 displaying the consumption performance calculated at step 440 by the processor 305 as a function of time relative to the consumption performance goal, and the method continues at step 405 with the processor 305 determining a material quantity performance goal. Upon a determination at step 450 by the processor 305 the quantity change was an accumulation change, the method continues at step 455 with the processor 305 calculating accumulation performance determined as a function of time based on quantity added and the accumulation performance goal. Then, the method continues at step 460 with the processor 305 displaying the accumulation performance calculated at step 455 by the processor 305 as function of time relative to the accumulation performance goal, and the method continues at step 405 with the processor 305 determining a material quantity performance goal.

FIG. 5 depicts an illustrative process flow of an embodiment MTE (Material Tracking Engine) tracking material consumption quantity performance as a function of time in an exemplary group consumption performance tracking scenario. The method depicted in FIG. 5 is given from the perspective of the MTE 325 implemented via processor-executable program instructions executing on the material tracking system base 135 processor 305, depicted in FIG. 3. In the illustrated embodiment, the MTE 325 executes as program instructions on the processor 305 configured in the MTE 325 host material tracking system base 135, depicted in at least FIG. 1, FIG. 2, and FIG. 3. In some embodiments, the MTE 325 may execute as a cloud service communicatively and operatively coupled with system services, hardware resources, or software elements local to and/or external to the MTE 325 host material tracking system base 135. The depicted method 500 begins at step 505 with the processor 305 detecting a container on the material tracking system base 135. In various designs, the processor 305 may detect the container based on various sensor data captured by the processor 305, including, for example, a weight sensor, a motion sensor, or an accelerometer. Then, the method continues at step 510 with the processor 305 identifying the container as a function of encoded data configured in the container. In various embodiments, the encoded data configured in the container may include an electromagnetic element encoding a unique container identifier. Then, the method continues at step 515 with the processor 305 associating the identified container to container user profile data and a user consumption quantity performance goal. In various examples, the processor 305 may associate the container to a user profile through a database. Then, the method continues at step 520 with the processor 305 determining the previous material quantity in the container, that is, the material quantity in the container before the container was detected on the base in this process instantiation. Then, the method continues at step 525 with the processor 305 measuring the material quantity determined as a function of container quantity sensor data. Then, the method continues at step 530 with the processor 305 determining if material was consumed, determined as a function of measured material quantity and previous material quantity. In some scenarios, the previous material quantity may not have been measured; for example, the user, or a system administrator, may have manually configured the previous material quantity. At step 535 the processor 305 performs a test to determine if material was consumed, based on the measured material quantity and previous material quantity evaluated at step 530 by the processor 305. Upon a determination at step 535 by the processor 305 material was not consumed, the method continues at step 560 with the processor 305 performing a test to determine if the user's material quantity performance is deficient relative to the user's material quantity performance goal. Upon a determination at step 560 by the processor 305 the user's material quantity performance is not deficient relative to the user's material quantity performance goal, the method continues at step 505 with the processor detecting another container on the base. Upon a determination at step 560 by the processor 305 the user's material quantity performance is deficient relative to the user's material quantity performance goal, the method continues at step 565 with the processor 305 displaying a deficit alert and consumption performance as a function of time relative to the consumption performance goal, and the method continues at step 505 with the processor detecting another container on the base. Upon a determination at step 535 by the processor 305 material was consumed, the method continues at step 540 with the processor 305 calculating consumption performance determined as a function of quantity consumed and the user's consumption performance goal. Then, the method continues at step 545 with the processor 305 displaying the consumption performance as a function of time relative to the consumption performance goal. At step 550 the processor 305 performs a test to determine if the user is a member of a material tracking group, such as, for example, an athletic club or exercise class. In some embodiments, such group performance may be used by an enterprise or corporation for employee wellness. In various examples, the processor 305 may determine the user is a member of a group based on associating the container identification determined by the processor 305 at step 510 with a user group database record. Upon a determination at step 550 by the processor 305 the user is a member of a material tracking group, the method continues at step 555 with the processor 305 updating the group profile data with the user's consumption performance, and the method continues at step 505 with the processor detecting another container on the base.

Figure 6A:
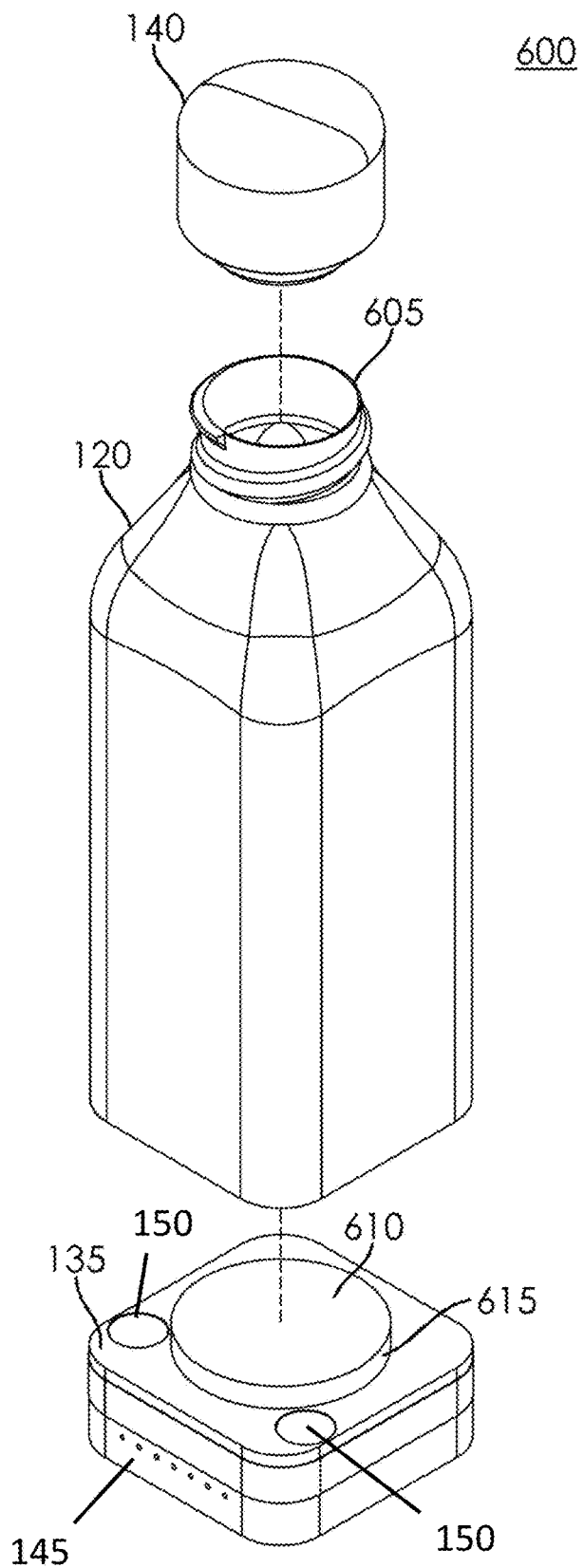
FIGS. 6A-6C together depict illustrative exploded views of an exemplary material tracking system.
Figure 6B:
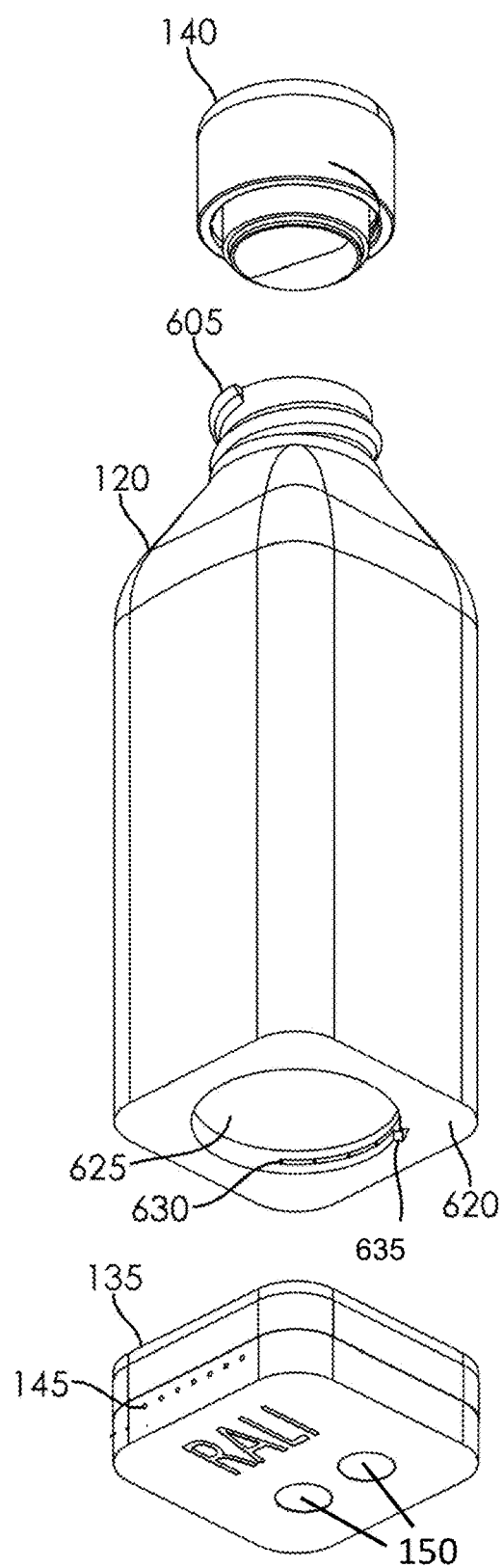
Figure 6C:
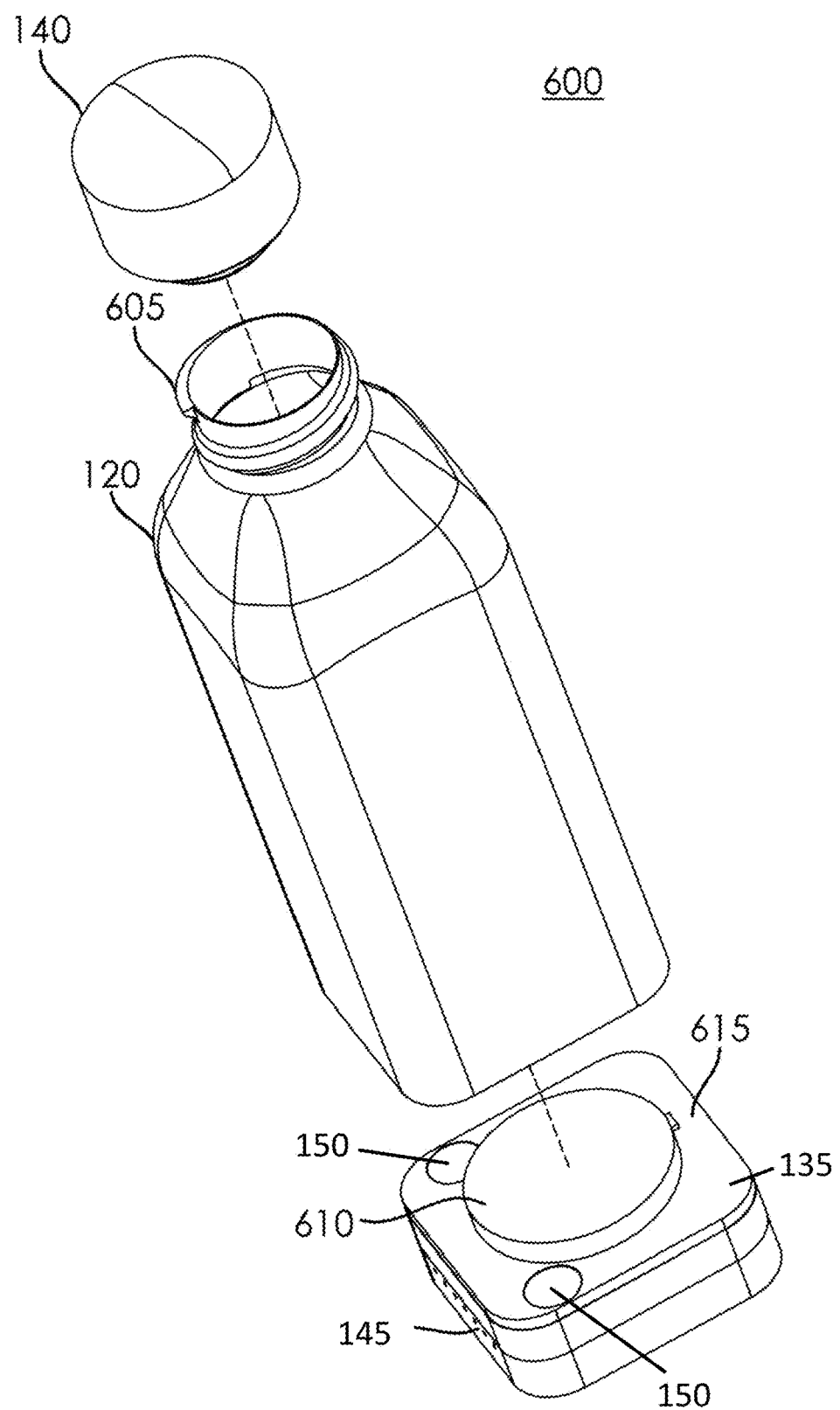

FIGS. 6A-6C together depict illustrative exploded views of an exemplary material tracking system. In the embodiment depicted by FIG. 6A, the exemplary material tracking system 600 includes the container 120, the base 135, and the cap 140. In the illustrated embodiment, the base 135 includes the control buttons 150 configured to permit a user to configure and activate various features of the exemplary material tracking system. The depicted base 135 embodiment includes the exemplary display 145 multiple dot display configured to visually present a user's consumption performance based on selectively illuminating each dot of the display 145 multiple dot display as a metrics display. In the depicted example, the container 120 is a bottle configured with the ridge 605 adapted to removably secure the cap 140 to the container 120. In the illustrated example, the base 135 is configured with the support 610 adapted to stabilize the container 120 on the base 135. In the depicted embodiment, the support 610 includes the locking tab 615 configured to engage the container with the base 135.

In the embodiment illustrated by FIG. 6B, the exemplary material tracking system 600 container 120 ridge 605 is positioned to removably secure the cap 140 to the container, permitting a user to easily access material in the container 120. In the depicted embodiment, the base 135 includes the display 145 configured to visually present as a function of time the material quantity change in the container 120 relative to a predetermined consumption goal. In some embodiments, the display 145 may include a strip of lighting elements in which each lighting element's illumination is controllable by a processor to present a visually distinct indication based on generating a unique color, pattern, or intensity combination activated by the processor. In the depicted embodiment, the base 135 includes the control buttons 150. The depicted base 135 embodiment also includes the exemplary display 145 multiple dot display configured to visually present a user's consumption performance based on selectively illuminating each dot of the display 145 multiple dot display as a metrics display. In the depicted embodiment, each lighting element of the display 145 may be illuminated to visually present as a function of time a user's measured water consumption relative to the user's water consumption goal in a predetermined time period. In the illustrated example, the container 120 bottom 620 includes the container adaptor 625 configured to engage the support 610, depicted in FIG. 6A. In the depicted embodiment, the container adaptor 625 includes the container securing slot 630 adapted to rotatably engage the container 120 with the locking tab 615, depicted in FIG. 6A. In the illustrated embodiment, the container securing slot 630 includes the container lock 635 configured to secure the container 120 with the base 135 locking tab 615. The depicted embodiment base 135 includes the controls 150 configured with buttons adapted to permit a user to configure and activate various features of the exemplary material tracking system 600.

In the embodiment illustrated by FIG. 6C, exemplary material tracking system 600 components are depicted in an illustrative exploded side perspective view.

FIGS. 7A-7C together depict various illustrative views of an exemplary material tracking system base. In FIG. 7A, the illustrative top perspective view of the depicted embodiment material tracking system base 135 includes the support 610 adapted to stabilize a container on the base 135. The embodiment material tracking system base 135 illustrated by FIG. 7A also includes the display 145 configured to visually present as a function of time the material quantity change in a container relative to a predetermined consumption goal. In the illustrated embodiment, the base 135 includes the exemplary display 145 multiple dot display configured to visually present a user's consumption performance based on selectively illuminating each dot of the display 145 multiple dot display as a metrics display. The depicted embodiment material tracking system base 135 also includes the control buttons 150.

In FIG. 7B, the illustrative material tracking system base 135 top view includes the support 610 configured with the locking tab 615 to engage a container with the base 135. The illustrated embodiment material tracking system base 135 includes the control buttons 150.

In the bottom perspective view depicted by FIG. 7C, the exemplary material tracking system base 135 includes the display 145 multiple dot display and the control buttons 150.

FIGS. 8A-8D together depict various illustrative views of an exemplary material tracking system container cap. In FIG. 8A, the exemplary cap 140 bottom perspective view includes the top 805 and outer side wall 810. In the illustrated example, the cap 140 includes the container plug 815 configured in the cap 140 inner side wall 820. In the depicted embodiment, the cap 140 includes the seal 825 configured in the container plug 815. The cap 140 embodiment illustrated by FIG. 8A also includes the groove 830 configured to secure the cap 140 to a threaded container opening by the plug outer side slot 835 when the cap 140 is inserted in the container opening.

FIG. 8B depicts an illustrative side view of the exemplary cap 140 depicted by FIG. 8A.

In FIG. 8C, the illustrated embodiment cap 140 plug outer side slot 835 is visible between the cap 140 outer side wall 810 and the container plug 815.

FIG. 8D illustrates an interior view of an exemplary cap 140 structural implementation.

FIGS. 9A-9B together depict illustrative side views of an exemplary material tracking system container handle. In the example depicted by FIG. 9A, the exemplary material tracking system assembly 900 includes the band 905 wrapped around the base of the cap 140. In the example depicted by FIG. 9A, the band 905 has been extended by a user pulling on the band 905 to form loop 910, creating the useful container handle 915. The exemplary material tracking system assembly depicted by FIG. 9A also includes the base 135 configured with the display 145. In the illustrated embodiment, the band 905 when retracted may secure at fastening point 920 to the material tracking system assembly 920. In the depicted example, the band 905 is attached to the cap 140. In various examples, the band 905 may be attached to the container 120. The example depicted by FIG. 9B illustrates the band 905 in an exemplary retracted configuration including the material tracking system assembly 900 base 135 supporting the container 120.

FIGS. 10A-10D together depict illustrative operational views of an embodiment material tracking system display configured to visually present as a function of time material quantity change relative to a predetermined material quantity performance goal. In the embodiments illustrated by FIGS. 10A-10D, the exemplary display 145 is depicted in illustrative embodiment material tracking display configurations. In the embodiments depicted by FIGS. 10A-10D, the display 145 includes a lighting element array configured as a strip of lighting elements wherein each lighting element's illumination is controllable by a processor to present a visually distinct indication based on generating a unique color, pattern, or intensity combination activated by the processor. In an illustrative example, various embodiment material tracking system display 145 implementations may include the exemplary multiple dot display depicted in at least FIGS. 6A, 6B, 6C, 7A, and 7C. In various embodiment material tracking system designs, an embodiment material tracking system display 145 may be the display 145 lighting element array depicted in at least FIGS. 10A-10D. In some embodiment material tracking system implementations, an embodiment material tracking system display 145 may be the display 145 multiple dot display depicted at least in FIGS. 6A, 6B, 6C, 7A, and 7C. In some examples, an embodiment material tracking system display 145 may include both the display 145 lighting element array and the display 145 multiple dot display. In an illustrative example, the display 145 multiple dot display may be configured as a metrics display. For example, each dot of the display 145 multiple dot display may be selectively illuminated as a metrics display to visually present a user's consumption performance. For example, each dot of the display 145 multiple dot display may correspond to 1 time period (for example, one day) and the user drinking a predetermined consumption quantity unit of a specified fluid (for example 64 oz) during that time period. In an illustrative example, if the user drank one such consumption quantity unit of the fluid in the first time period (for example Sunday), the first dot lights up; if the user does not drink at least the predetermined consumption quantity unit in the second time period (for example Monday), then the second dot does not light up. In the depicted embodiment, each lighting element of the display 145 lighting element array may be illuminated to visually present as a function of time a user's measured material quantity consumption or accumulation relative to the user's material quantity goal in one time period. In some examples, an embodiment material tracking system may illuminate each lighting element of the display 145 with a different color or pattern to indicate varying degrees of material quantity consumption relative to a consumption goal in the time period represented by the lighting element. In an example illustrative of various embodiments' design and usage, the user's material quantity performance over a period of time such as, for example, an eight-hour day, may be visually presented by multiple lighting elements configured in the display 145, wherein each lighting element may represent the user's material quantity performance during a period subset of the eight-hour day. In some embodiments, the display 145 lighting element strip may be configured to wrap around a storage container such as a bottle. In some embodiment designs, the display 145 multiple dot display may be configured to wrap around a storage container. In various examples, the display 145 lighting element strip may be configured in an embodiment material tracking system base.

Figure 10A:
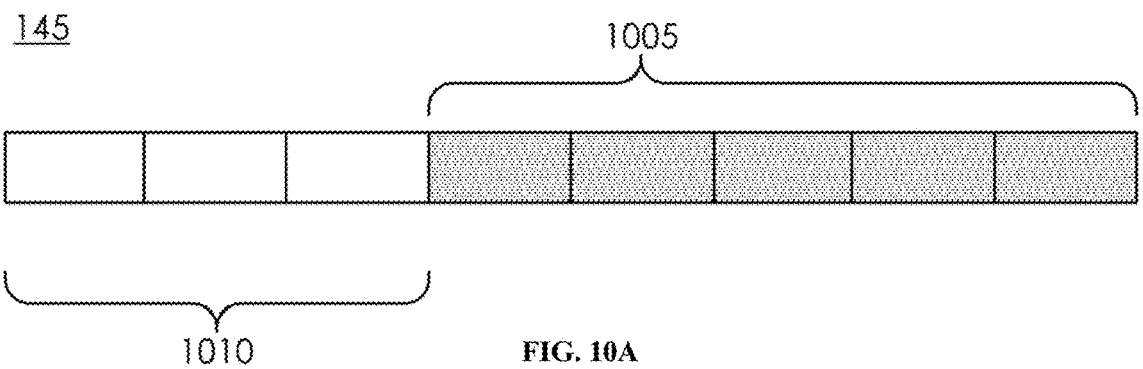
FIGS. 10A-10D together depict illustrative operational views of an embodiment material tracking system display configured to visually present as a function of time material quantity change relative to a predetermined material quantity performance goal.

In the embodiment depicted by FIG. 10A, the exemplary display 145 includes the three lighting elements 1010 illustrated as illuminated in an exemplary 'On' configuration displaying an exemplary first indication pattern. In the illustrated example, each of the eight lighting elements 1005 and 1010 represent one eight-ounce unit of water. In the depicted example, the user's material quantity consumption goal is to consume eight eight-ounce units of water per day, or sixty-four ounces of water per day. In the illustrated example, an embodiment material tracking system tracks the user's consumption based on sensor data, and visually presents as a function of time the measured material quantity consumed relative to the consumption goal, to display the user's material quantity consumption performance as a function of time in the display 145. In the depicted embodiment, as the embodiment material tracking system determines the user has consumed each eight-ounce unit of water, the embodiment material tracking system illuminates one of the lighting elements configured in the display 145. In the depicted example, the three lighting elements 1010 are 'On,' indicating the material tracking system has determined the user's consumption is twenty-four ounces of water. In some embodiments, when the material tracking system determines the user reached the sixty-four ounce consumption goal (with all eight lighting elements illuminated), the material tracking system may turn off and restart the display 145 lighting element indications, in a color or lighting pattern different from the depicted first indication pattern displayed by lighting elements 1010. In the depicted embodiment, the exemplary display 145 includes the lighting elements 1005 illustrated in an exemplary 'Off' configuration indicating material quantity performance has not yet been tracked for the quantities or time slots represented by the lighting elements 1005.

Figure 10B:
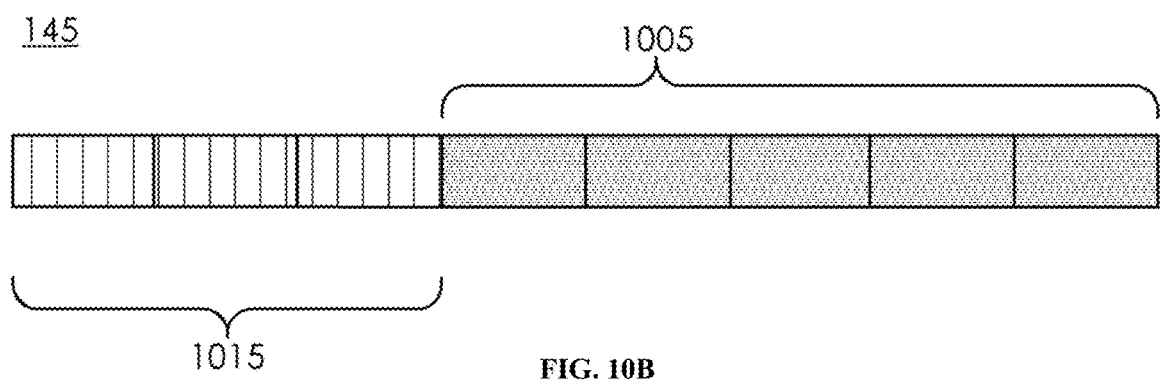

In the embodiment depicted by FIG. 10B, the exemplary display 145 includes the three lighting elements 1015 illustrated as illuminated in an exemplary 'On' configuration displaying an exemplary second indication pattern. In the depicted example, the embodiment material tracking system determined the user exceeded the sixty-four ounce level depicted by FIG. 10A, and restarted the display 145 lighting element indications using the exemplary second indication pattern illuminated in the lighting elements 1015 to indicate the user has consumed eighty-eight ounces of water. In the depicted embodiment, the exemplary display 145 includes the lighting elements 1005 illustrated in an exemplary 'Off' configuration indicating material quantity performance has not yet been tracked for the quantities or time slots represented by the lighting elements 1005.

Figure 10C:
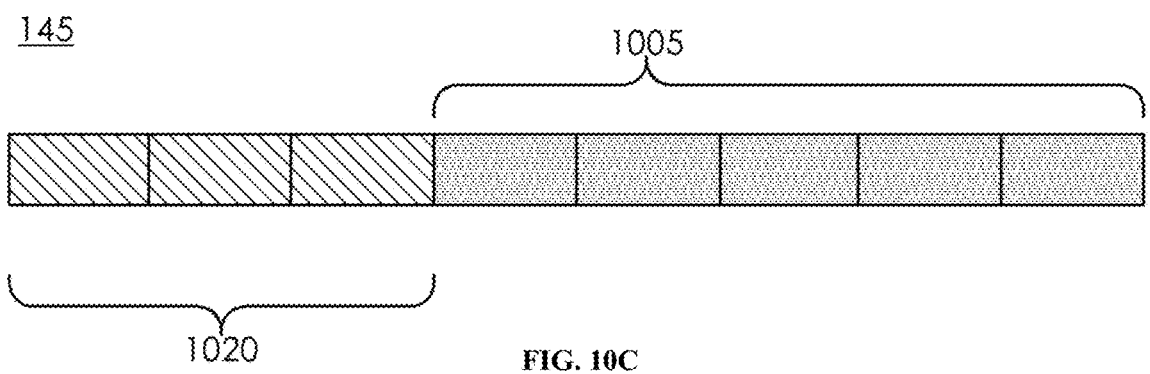

In the embodiment depicted by FIG. 10C, the exemplary display 145 includes the three lighting elements 1020 illustrated as illuminated in an exemplary 'On' configuration displaying an exemplary third indication pattern. In the depicted example, the embodiment material tracking system determined the user exceeded the one-hundred-twenty-eight ounce level depicted by FIG. 10B, and restarted the display 145 lighting element indications using the exemplary third indication pattern illuminated in the lighting elements 1020 to indicate the user has consumed one-hundred-fifty-two ounces of water. In the depicted embodiment, the exemplary display 145 includes the lighting elements 1005 illustrated in an exemplary 'Off' configuration indicating material quantity performance has not yet been tracked for the quantities or time slots represented by the lighting elements 1005.

Figure 10D:
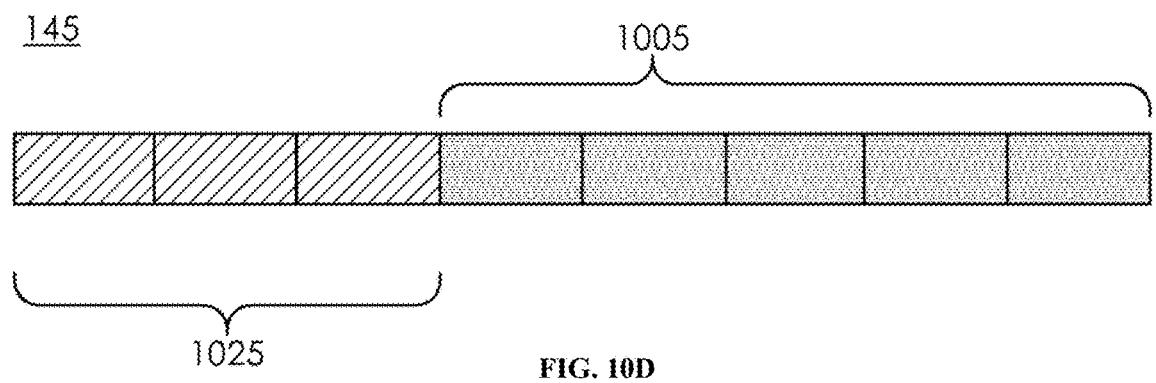

In the embodiment depicted by FIG. 10D, the exemplary display 145 includes the three lighting elements 1025 illustrated as illuminated in an exemplary 'On' configuration displaying an exemplary fourth indication pattern. In the illustrated example, the embodiment material tracking system determined the user exceeded the one-hundred-ninety-two ounce level depicted by FIG. 10C, and restarted the display 145 lighting element indications using the exemplary fourth indication pattern illuminated in the lighting elements 1025 to indicate the user has consumed two-hundred-sixteen ounces of water. In the depicted embodiment, the exemplary display 145 includes the lighting elements 1005 illustrated in an exemplary 'Off' configuration indicating material quantity performance has not yet been tracked for the quantities or time slots represented by the lighting elements 1005.

Although various embodiments have been described with reference to the Figures, other embodiments are possible. For example, some embodiment designs may provide a smart water bottle that 1) tracks water intake by tracking water consumption from the bottle itself, 2) displays water intake on the bottle itself via LED lights that wrap around the circumference of the bottle, and 3) vibrates to remind the user to drink water. In an example illustrative of various embodiments' design and usage, some implementations may include outward facing metrics of the container's contents on the outside of the container via LED lights, configured so a user may see on the bottle itself how much water they have consumed over time. Various embodiment material tracking system implementations may include a lid configured with a vacuum seal to maintain interior temperature. Some embodiment lid designs may include ridges to make the lid easy to twist on and off a bottle. Some embodiments may include a bottle holding mechanism configured from a band wrapped around the base of the lid, that the user can tug at to hold the bottle (for example, while walking). In an illustrative example, the band does not have to be attached to the lid; in some examples, the band may be attached to the bottle itself, snapping back to the lid when the band is not being used, similar to a rubber band snapping (slowly, unpainfully) into place. In some examples, the band may be pulled on with a little force, so that the user's hand doesn't touch the bottle as they're holding the bottle. In some designs, an embodiment band may be a thick elastic band similar to a silicone band, to snap back into place when not in use. In some designs, the band may be secured with a steel fastener, or, there may be no fastener, and half the band may be glued to the bottle, whereas the other half may be pulled off the bottle.

In some designs, an embodiment material tracking system may include a mobile app configured to permit a user to track individual or group goals, and input personal health metrics to get a more individualized experience (so the goals and outwards facing metrics are dependent on how much a certain individual needs to drink per day).

Some embodiment implementations may include a stainless steel bottle with a detachable base (with lights/battery/processor configured in the base, separate from the bottle itself). Various embodiment material tracking system designs may include a filtration system in the material container. Some designs may utilize pH detection to determine water quality. Various implementations may include a self-cleaning bottle. Some designs may be configured for self-temperature setting or self-temperature control. Applications of various embodiment material tracking system implementations may include using a weight sensor in luggage, to implement a self-weighing luggage bag. Various designs may include lunchbox implementations that track the quantity of the lunchbox contents. In an illustrative example, containers other than water bottles or bottles in general may be used with embodiment tracking or outward facing metrics features.

Various designs may include an embodiment liquid level sensor. In some designs, an embodiment liquid sensor may permit tracking fluid level fluctuation constantly. Some embodiments may include a load or weight sensor, and an accelerometer. Some embodiment material tracking system implementations may include a base that is essentially a scale configured to measure the weight of a container placed on the base, and track the container contents. Various embodiment designs may reset sensor measurement every day at a set time, for example 12:00 AM. Some embodiment implementations may calibrate sensor measurements when set on a flat surface.

Some embodiment display designs may include more than one lighting element strip, configured one above the other on a bottle. For example, a top strip that wraps around the bottle may be illuminated one lighting element at a time as an embodiment material tracking system determines a user has consumed each tracked unit of water. Some examples may implement a celebration display feature flashing multicolored light around a lighting element strip when a user reaches predetermined goals. In various scenarios, a lighting element strip wrapped around a bottle may be referred to as a light ring. Some embodiments may flash a top ring (White) when the user is filling up the bottle, and when filling is done (to prevent the user overflowing the bottle when filling) flash a light to warn a user to stop filling the bottle. Various designs may flash a bottom ring when a battery is low, or to alert the user of an error condition.

Some embodiment material tracking system display designs may employ dots on the bottom of a bottle to visually present a user's consumption performance. For example, on the bottom of the bottle, each dot may correspond to 1 day of the user drinking at least 64 oz (at least 8 glasses of water). In an illustrative example, if the user drank 8 glasses of water on Sunday, the first dot lights up; if the user does not drink at least 8 glasses of water on Monday, then the second dot does not light up.

Sleep Mode

Some embodiments may include a sleep mode. In illustrative non-limiting examples:
- If the user has not consumed any water for more than 2 hours, the lights go to sleep but the bottle will still vibrate
- If the user has not consumed any water for more than 4 hours, the lights go to super sleep and the bottle will not vibrate (in an effort to save battery life)
- When the user drinks water (when the sensor detects water fluctuation), the lights turn back on.

Vibration Reminder

Some embodiments may include a vibration reminder. In illustrative non-limiting examples:
- The bottle vibrates every 2 hours to remind the user to drink more water
- The bottle vibrates even during sleep mode but not during super sleep mode (past 4 hours)
- The bottle vibrates at the same time as the celebration light feature
- The strength of the vibration should be felt if the bottle is in a bag
- Vibration may be turned on/off
- The bottle vibrates when the user is behind the consumption goal.

Buttons

Some embodiments may include buttons. In illustrative non-limiting examples:
- On the bottom of the bottle (facing the ground)—out of sight
- On the base of the bottle facing up
- Have to be held for 4 seconds→to avoid accidental pressing of the button
- Some sort of indication that the button has been activated (this can be some type of buzz or light). That way the user knows that something happened after pressing the button for 4 seconds
- Hard Clear needs to be held for 8 seconds
- The container can have many different inputs, such as buttons that can take many forms, shapes, sizes, and functions. One example is a capacitive sensing button, these can be located anywhere inside or outside the container or inside or outside the lid. The button functionalities can include but are not limited to a reset functionality that can reset all data collected in the last hour, switch functionalities that control the displays/lighting temporarily and that control the vibration intensity and whether it is on or off.
- Buttons are inverted, so they are harder to accidentally press Exemplary Button Configurations (Bottom of Bottle)
- Vibration on/off: turns vibration on/off indefinitely
- Light On/Off: turns lights off for 2 hours MAX
- Soft Clear: Clears all data collected in the last 1 hour (this is to mitigate the case of a spill or washing the bottle)
- Hard Clear: Clears all data from the past 24 hours (Needs to be pressed for 8 seconds)

Charger/Battery

Some embodiments may include a charger/battery. In illustrative non-limiting examples:
- Minimum four day life
- Reusable battery
- Micro B type USB
- Full battery charge less than one hour
- Charging is on the bottom side of the bottle, where the removable bottom may result in the bottle being easier to charge
- Bottom light ring flashes red when battery low
- The container can be charged in a variety of different ways. One instance is using a cable wire and/or wall charger to charge a part of the bottle, such as the base of the bottle. The container can use a variety of different batteries that are reusable and/or replaceable. The battery could also be charged wirelessly, such as with the Qi wireless charger. The battery could be housed in the base of the container or in the lid or in a different part of the container.
- The base may have Qi wireless charging.
- The battery and container can feature design elements that allow for the conversation of battery and product life as can be done by utilizing accelerometer/gyroscope data/information, container usage, container battery life. For instance, the display system(s) or sensors may decrease in intensity/luminosity/viewing in the case of the inactivity of the container and it is possible for the container to enter a "sleep" state.
- The battery may indicate that it is low through the use of flashing lights on the bottle itself or other means of communicating that information through the display or vibration or a host of other solutions.

Various embodiment implementations may provide a bottle that tracks liquid fluctuation. Some embodiments may include a container that tracks and measures contents. In an illustrative example, some embodiment designs may monitor and reports the amount of liquid consumed by a user from a bottle. In some embodiment configurations, sensors in the bottle may track the varying levels of liquid in the bottle over the course of time. Via processors, the sensor communicates with exterior display lights on the bottle that represent the amount of liquid consumed from the bottle. In some embodiments, if certain amounts of liquid are not consumed over the course of time and in other instances/situations, the display lights will change in composition/color and the vibration mechanism in the bottle will be activated.

Container

Some embodiments include a container. In illustrative non-limiting examples:
- The container may be made out of durable stainless steel, dish washable, and/or can handle extreme heat and cold. The container could also be made out of a variety of other materials (i.e. plastic, glass). The container could be washed in a variety of different ways (i.e. dishwashing, handwashing). The container and its lid can also clean itself through an ultraviolet sensor, UV-C LED light, and a variety of other sterilization technologies. In addition, the contents of the container upon entrance can be filtered by a variety of different filtration technologies. The container size can be a multitude of sizes. The container can be used to hold any liquid or solid. The container can take any shape (i.e. can be a rectangular prism, sphere).

One example of the container is a multi-parted bottle. This bottle has multiple lids, the bottle itself, multiple sensors, and removable bottom piece(s) that include but are not limited to batteries, additional sensors, charging functionalities, LED displays, displays made from other materials.

The container can also have sensing capabilities on the interior and exterior of itself. For instance, tapping the container may elicit a response or system change.

The container can receive information and commands from outside sources that can then impact the container functionality and output.

The container and its lids can feature solar panels that power the container technology and surrounding devices. The container and/or lid can implement photovoltaic (PV) systems and use solar cells to convert sunlight into electricity. The container can use and generate renewable and other types of energy. The containers are sustainably made and sustainably focused. For instance, the movement of liquids can generate hydraulic-based energy and hydroelectric power.

The container can impact the taste, texture, and other aspects of the contents based on inputted user preferences. The user can add in their preferred flavors to the contents, which could come with (be sold with) the container.

Temperature control: The container and/or lid (and user) can control the temperature of the container contents and the container itself. The container can heat and/or cool itself.

Location tracking: The container and/or lid can be tracked by the user through the use of an external device. This can be done, for instance, with Bluetooth or Bluetooth low energy tracking.

Outward-Facing Metrics/Display

Some embodiments include a display. In illustrative non-limiting examples:

On or in the container there is a display or multiple displays that track different metrics ranging from the weight of the contents in the container and other metrics of the liquid and/or solid contents in the container (this can include the amount of the contents in the container, health information, calorie count, ingredients, fat, cholesterol, sodium, carbohydrates, vitamin count, among other nutrients). This information can be displayed in a variety of different ways on or in the container, on or in the lid or closure of the container, and/or on a different device (i.e. phone, tablet, computer) via an application or applet or another way. One example that may be used to display the tracking of the amount of water in a container or tracking of the amount of water that has entered or exited (via consumption or otherwise), is via a ring LED display on or in the container. For instance, the container may have one or more LED rings that wrap the circumference of the container and display the tracking of liquid consumption from the bottle or tracking of liquid fluctuation in the bottle by means of a progress bar or other display. This display could be with numbers or words/letters. One instance of a possible display is two rings that go around the container. The top ring has eight different ticks/eight different led lights, that light up according to how much liquid or solid (such as water) has been consumed from the container by the user. Each tick or LED light would correspond to eight oz. The second ring would have x number of ticks that correspond to a unit of time, such as a day, and would light up accordingly to the user drinking or consuming a certain amount of the liquid or solid in the container. For instance, if there were seven ticks in the ring, each would light up in accordance with whether or not the user had consumed a certain amount of the liquid and/or solid that was in the container. In the specific case of water, on the days that the user had drunk at least sixty-four ounces of water, the LED light would light a specific color or not light at all and a similar or different action would occur on the days the user had not drunk at least sixty-four ounces of water. Also, the lights/display can be used to indicate other information about the contents, such as the amount in the container, or information on the health of the product in terms of battery or sensor life for example. The container could have multiple displays in different locations. The display could also be on the lid or closure of the container. The displays can be a variety of sizes and can come in different shapes and colors. The display could be featured via an application on a phone or elsewhere, through Bluetooth or other technological capabilities in the container.

When the user is filling up the container with any substances, the display flashes a color to indicate that it is getting to the point of being too full.

Reminders

Various embodiments include a reminder. In illustrative non-limiting examples:

The containers, coupled perhaps with external devices, can elicit reminders and send other messages to the user in the form of vibrations, lights, audio, lettering, and/or a combination of those means or another means of communication. For instance, the container shaped like the bottle can vibrate periodically or based on some correspondence with the container's contents, such as liquid and/or solid level of the contents in the container.

Tracking/Sensor

Some embodiments include one or more sensor configured to capture various measurements to facilitate material tracking. In illustrative non-limiting examples:

The container contents can be tracked in a variety of different ways. An accelerometer and/or a gyroscope can be used to measure and track the orientation of the container.

(1) A sensor stick can run the length or width of the bottle and it can be used to track the contents of the container. In the case of liquid in a container (like a bottle), the sensor stick tracks the amount of liquid in the container at different time intervals to calculate, for instance, consumption.

(2) A camera or multiple cameras or other variations of devices that record visual images can be placed inside or outside the container to capture the contents and composition of the contents (3) An ultrasonic sensor or another instrument transmitting and receiving ultrasonic signals in the lid or in another location in or outside of the container can be placed in, outside, or around the container, such as in the lid to measure and get information on the contents of the container.

(4) Different types of capacitors and other types of technologies that may or may not be based on capacitive coupling can be placed in or outside of the bottle. This can take the place of a copper conductive capacitive structure or a parallel plate capacitor. This can be used to detect and measure proximity, pressure, position and displacement, force, humidity, fluid level, and acceleration. The capacitive sensors can be used for both tracking contents, replacing mechanical buttons, as an input device, among other uses.

(5) Weight sensor on or in the container that tracks the contents' weight among other features.

(6) Sensors can be used to track the flow of liquids and/or solids exiting and entering the container.

(7) Sensors can be used to track the use pattern of the user. The drinking or eating or overall consuming pattern of the user can be recorded and analyzed. Machine learning may be applied here to understand and predict a user's consumption pattern.

(8) Light detector sensor, among other photoelectric sensors, can be used to detect the presence or the absence of solids and/or liquids in the bottle. This includes other light-emitting sensors.

(9) Electrode level sensors and level switches, as well as other configurations of sensors and devices, can use electrodes to detect liquid levels. This includes conductive level controllers and other types of electronic liquid level detectors that can be coupled with different types of circuits, such as the self-holding circuit. Different level controllers and electrode holders can be used as well. These sensors can take different shapes, forms, and sizes, such as a capacitive structure.

(10) Float Level switches and sensors can be used, among other technologies/devices that involve float(s) and magnet(s). With the float rising or falling with the liquid level, there is a magnetic field generated from within the float, potentially with a magnetic reed switch as well.

Liquid Content Sensor is a sensing element that's resistance changes with temperature. The additional power used to maintain the constant temperature of the device is used to measure the liquid content striking the wire. This is another methodology for sensing the liquid in a container.

Other examples of possible proximity sensors include an optical sensor, magnetic sensor, capacitive sensor, sonar sensors such as an ultrasonic sensor, infrared IR technology, Radio-Frequency (RFID) sensors, Inductive sensors, and any sensor or device that utilizes the Hall Effect.

All sensors can be made out of different materials, can be of different shapes and sizes, can vary in their use cases, and can be used in multiple settings. Sensors, devices, and technologies can include different considerations, involving but not limited to the nature of the substance (percentage solid and/or liquid), viscosity, temperature, and pressure. The sensors, LEDs, displays, lights and other devices in and on the container are subject to waterproofing technology, such as but not limited to, applying water-repellent coatings or by sealing seams with gaskets or O-rings. The container, and sensors can be connected to a timer/clock.

An antenna may be placed in/on the container/lid for outside communication, such as with a (portable) computing device via a local area network, like a Wi-Fi network, a hotspot, a personal network or curated company network, or a wide area network, like the Internet.

The container/lid has a memory unit.

The container/lid has a processor/processing unit, which is sealed with waterproofing. It can be located anywhere in/on the container/lid.

The container/lid also includes a microcontroller unit (MCU)

In some embodiments, a weight sensor may include a load cell. Some embodiment load cell configurations may employ a single point load cell design.

Clock Chip

Various embodiment material tracking system implementations may include a clock chip configured to provide accurate time to the material tracking system. In an illustrative example, an embodiment material tracking system may use data provided by a weight sensor to track fluctuation in the weight of contents in a container over time. Time may be tracked by a clock chip providing the correct time to configure the metrics display, for example, the 7 Dot Lights=7 days of the week (on the front of the base). The clock knows when to reset the daily and weekly content tracking. The LED Light Strip tracks the content fluctuation over the course of the day and resets every single day at 12:00 AM.

Types of Lids

Various embodiments include a lid. In illustrative non-limiting examples:

(1) the container could have a smart lid that displays information about the contents of the container and can take inputs from the user that change the mechanisms of the container. The smart lid can be combined with any other type of lid.

(2) the active lid: the active lid opens in one-click, making it easier to consume container contents on the go (3) screw lid: regular screw lid that user twists on/off to consume/drink from the container (4) straw lid: there is a hole in the lid that allows for a straw to be placed for the user to drink from The container can have many different variations of lids. These are a few examples of which may or may not be used. The container could most likely function without the lid in place. The lid may be made from a variety of different materials (not limited to plastic, steel, wood, etc.). The lid can be in many different sizes, shapes, colors, and the lid can serve different functions outside of closing the container. For instance, the lid can have the attachments of sensors, like the ultrasonic sensor, that can track the amount of contents within the container. The lid could potentially feature solar panel or panels that produce energy for the container to function its technology or technologies.

The lid and/or container opening could potentially feature sensor(s) or (an)other device(s) that sense when the container is open/closed and to what extent, how much of the contents has exited or entered the container, and other information on the contents of the container or the container itself.

Various embodiment material tracking system designs may inform the user of how much water they have consumed, and how far they are from their hydration goal on the bottle itself, with visual user metrics updated on the bottle, based on tracking hydration levels and providing audiovisual cues to remind users to stay hydrated. Various embodiments may indicate to the user how much water they have consumed so far, and how far they are from their hydration goals.

Some embodiment examples may include the following three elements: (1) a water bottle, (2) a liquid level sensor, and a (3) metrics monitor. In an illustrative example, Element 2 (Liquid level sensor) is attached to Element 1 (Water bottle) so that Element 2 can sense the amount of water in Element 1 and then send those results to Element 3 (Metrics Monitor), which then displays the results in relation to water level goals set by the user. For example, Element 1 (Water Bottle) is filled with water by the user. Element 2 (Liquid Level Sensor) is placed inside Element 1 (Water Bottle), records the water levels inside, and sends the data/results to Element 3 (Metrics Monitor) which displays how much water has been consumed by the user.

Various embodiment designs may be constructed by attaching a liquid level sensor to a water bottle and constructing a monitor that accepts transmissions from the liquid level sensor. The monitor displays the results of the liquid level sensor.

In various examples illustrative of exemplary embodiments' design and usage, a person would add water to the water bottle, the level of water in the water bottle would be recorded, and as the person drinks water throughout the day, their water intake is monitored by the sensor and sent to the monitor to visually represent the person's water intake, based on a water bottle that tracks hydration levels and reminds user to drink water from a system that has user metrics on the bottle and is made of environmentally-friendly products.

In the Summary above and in this Detailed Description, and the Claims below, and in the accompanying drawings, reference is made to particular features of various embodiments of the invention. It is to be understood that the disclosure of embodiments of the invention in this specification includes all possible combinations of such particular features. For example, where a particular feature is disclosed in the context of a particular aspect or embodiment of the invention, or a particular claim, that feature can also be used—to the extent possible—in combination with and/or in the context of other particular aspects and embodiments of the invention, and in the invention generally.

While multiple embodiments are disclosed, still other embodiments of the present invention will become apparent to those skilled in the art from this detailed description. The invention is capable of myriad modifications in various obvious aspects, all without departing from the spirit and scope of the present invention. Accordingly, the drawings and descriptions are to be regarded as illustrative in nature and not restrictive.

It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments.

In the present disclosure, various features may be described as being optional, for example, through the use of the verb "may;", or, through the use of any of the phrases: "in some embodiments," "in some implementations," "in some designs," "in various embodiments," "in various implementations,", "in various designs," "in an illustrative example," or "for example;" or, through the use of parentheses. For the sake of brevity and legibility, the present disclosure does not explicitly recite each and every permutation that may be obtained by choosing from the set of optional features. However, the present disclosure is to be interpreted as explicitly disclosing all such permutations. For example, a system described as having three optional features may be embodied in seven different ways, namely with just one of the three possible features, with any two of the three possible features or with all three of the three possible features.

In various embodiments, elements described herein as coupled or connected may have an effectual relationship realizable by a direct connection or indirectly with one or more other intervening elements.

In the present disclosure, the term "any" may be understood as designating any number of the respective elements, i.e. as designating one, at least one, at least two, each or all of the respective elements. Similarly, the term "any" may be understood as designating any collection(s) of the respective elements, i.e. as designating one or more collections of the respective elements, a collection comprising one, at least one, at least two, each or all of the respective elements. The respective collections need not comprise the same number of elements.

While various embodiments of the present invention have been disclosed and described in detail herein, it will be apparent to those skilled in the art that various changes may be made to the configuration, operation and form of the invention without departing from the spirit and scope thereof. In particular, it is noted that the respective features of embodiments of the invention, even those disclosed solely in combination with other features of embodiments of the invention, may be combined in any configuration excepting those readily apparent to the person skilled in the art as nonsensical. Likewise, use of the singular and plural is solely for the sake of illustration and is not to be interpreted as limiting.

The Abstract is provided to comply with 37 C. F. R. § 1.72(b), to allow the reader to quickly ascertain the nature of the technical disclosure and is submitted with the understanding that it will not be used to interpret or limit the scope or meaning of the claims.

In the present disclosure, all embodiments where "comprising" is used may have as alternatives "consisting essentially of," or "consisting of." In the present disclosure, any method or apparatus embodiment may be devoid of one or more process steps or components. In the present disclosure, embodiments employing negative limitations are expressly disclosed and considered a part of this disclosure.

Certain terminology and derivations thereof may be used in the present disclosure for convenience in reference only and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted.

The term "comprises" and grammatical equivalents thereof are used herein to mean that other components, ingredients, steps, among others, are optionally present. For example, an embodiment "comprising" (or "which comprises") components A, B and C can consist of (i.e., contain only) components A, B and C, or can contain not only components A, B, and C but also contain one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range beginning with that number (which may be a range having an upper limit or no upper limit, depending on the variable being defined). For example, "at least 1" means 1 or more than 1. The term "at most" followed by a number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)-(a second number)," this means a range whose limit is the second number. For example, 25 to 100 mm means a range whose lower limit is 25 mm and upper limit is 100 mm.

Many suitable methods and corresponding materials to make each of the individual parts of embodiment apparatus are known in the art. According to an embodiment of the present invention, one or more of the parts may be formed by machining, 3D printing (also known as "additive" manufacturing), CNC machined parts (also known as "subtractive" manufacturing), and injection molding, as will be apparent to a person of ordinary skill in the art. Metals, wood, thermoplastic and thermosetting polymers, resins and elastomers as may be described herein-above may be used. Many suitable materials are known and available and can be selected and mixed depending on desired strength and flexibility, preferred manufacturing method and particular use, as will be apparent to a person of ordinary skill in the art.

Any element in a claim herein that does not explicitly state "means for" performing a specified function, or "step for" performing a specific function, is not to be interpreted as a "means" or "step" clause as specified in 35 U.S.C. § 112 (f). Specifically, any use of "step of" in the claims herein is not intended to invoke the provisions of 35 U.S.C. § 112 (f). Elements recited in means-plus-function format are intended to be construed in accordance with 35 U.S.C. § 112 (f).

Recitation in a claim of the term "first" with respect to a feature or element does not necessarily imply the existence of a second or additional such feature or element.

The phrases "connected to," "coupled to" and "in communication with" refer to any form of interaction between two or more entities, including mechanical, electrical, magnetic, electromagnetic, fluid, and thermal interaction. Two components may be functionally coupled to each other even though they are not in direct contact with each other. The term "abutting" refers to items that are in direct physical contact with each other, although the items may not necessarily be attached together.

The word "exemplary" is used herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

Reference throughout this specification to "an embodiment" or "the embodiment" means that a particular feature, structure or characteristic described in connection with that embodiment is included in at least one embodiment. Thus, the quoted phrases, or variations thereof, as recited throughout this specification are not necessarily all referring to the same embodiment.

Similarly, it should be appreciated that in the above description of embodiments, various features are sometimes grouped together in a single embodiment, Figure, or description thereof for the purpose of streamlining the disclosure. This method of disclosure, however, is not to be interpreted as reflecting an intention that any claim in this or any application claiming priority to this application require more features than those expressly recited in that claim. Rather, as the following claims reflect, inventive aspects may lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

According to an embodiment of the present invention, the system and method may be accomplished through the use of one or more computing devices. As depicted, for example, at least in FIG. 1, FIG. 2, and FIG. 3, one of ordinary skill in the art would appreciate that an exemplary system appropriate for use with embodiments in accordance with the present application may generally include one or more of a Central Processing Unit (CPU), Random Access Memory (RAM), a storage medium (e.g., hard disk drive, solid state drive, flash memory, cloud storage), an operating system (OS), one or more application software, a display element, one or more communications means, or one or more input/output devices/means. Examples of computing devices usable with embodiments of the present invention include, but are not limited to, proprietary computing devices, personal computers, mobile computing devices, tablet PCs, mini-PCs, servers or any combination thereof. The term computing device may also describe two or more computing devices communicatively linked in a manner as to distribute and share one or more resources, such as clustered computing devices and server banks/farms. One of ordinary skill in the art would understand that any number of computing devices could be used, and embodiments of the present invention are contemplated for use with any computing device.

In various embodiments, communications means, data store(s), processor(s), or memory may interact with other components on the computing device, in order to effect the provisioning and display of various functionalities associated with the system and method detailed herein. One of ordinary skill in the art would appreciate that there are numerous configurations that could be utilized with embodiments of the present invention, and embodiments of the present invention are contemplated for use with any appropriate configuration.

According to an embodiment of the present invention, the communications means of the system may be, for instance, any means for communicating data over one or more networks or to one or more peripheral devices attached to the system. Appropriate communications means may include, but are not limited to, circuitry and control systems for providing wireless connections, wired connections, cellular connections, data port connections, Bluetooth connections, or any combination thereof. One of ordinary skill in the art would appreciate that there are numerous communications means that may be utilized with embodiments of the present invention, and embodiments of the present invention are contemplated for use with any communications means.

Throughout this disclosure and elsewhere, block diagrams and flowchart illustrations depict methods, apparatuses (i.e., systems), and computer program products. Each element of the block diagrams and flowchart illustrations, as well as each respective combination of elements in the block diagrams and flowchart illustrations, illustrates a function of the methods, apparatuses, and computer program products. Any and all such functions ("depicted functions") can be implemented by computer program instructions; by special-purpose, hardware-based computer systems; by combinations of special purpose hardware and computer instructions; by combinations of general purpose hardware and computer instructions; and so on—any and all of which may be generally referred to herein as a "circuit," "module," or "system."

While the foregoing drawings and description may set forth functional aspects of the disclosed systems, no particular arrangement of software for implementing these functional aspects should be inferred from these descriptions unless explicitly stated or otherwise clear from the context.

Each element in flowchart illustrations may depict a step, or group of steps, of a computer-implemented method. Further, each step may contain one or more sub-steps. For the purpose of illustration, these steps (as well as any and all other steps identified and described above) are presented in order. It will be understood that an embodiment can contain an alternate order of the steps adapted to a particular application of a technique disclosed herein. All such variations and modifications are intended to fall within the scope of this disclosure. The depiction and description of steps in any particular order is not intended to exclude embodiments having the steps in a different order, unless required by a particular application, explicitly stated, or otherwise clear from the context.

Traditionally, a computer program consists of a sequence of computational instructions or program instructions. It will be appreciated that a programmable apparatus (i.e., computing device) can receive such a computer program and, by processing the computational instructions thereof, produce a further technical effect.

A programmable apparatus may include one or more microprocessors, microcontrollers, embedded microcontrollers, programmable digital signal processors, programmable devices, programmable gate arrays, programmable array logic, memory devices, application specific integrated circuits, or the like, which can be suitably employed or configured to process computer program instructions, execute computer logic, store computer data, and so on. Throughout this disclosure and elsewhere a computer can include any and all suitable combinations of at least one general purpose computer, special-purpose computer, programmable data processing apparatus, processor, processor architecture, and so on.

It will be understood that a computer can include a computer-readable storage medium and that this medium may be internal or external, removable and replaceable, or fixed. It will also be understood that a computer can include a Basic Input/Output System (BIOS), firmware, an operating system, a database, or the like that can include, interface with, or support the software and hardware described herein.

Embodiments of the system as described herein are not limited to applications involving conventional computer programs or programmable apparatuses that run them. It is contemplated, for example, that embodiments of the invention as claimed herein could include an optical computer, quantum computer, analog computer, or the like.

Regardless of the type of computer program or computer involved, a computer program can be loaded onto a computer to produce a particular machine that can perform any and all of the depicted functions. This particular machine provides a means for carrying out any and all of the depicted functions.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Computer program instructions can be stored in a computer-readable memory capable of directing a computer or other programmable data processing apparatus to function in a particular manner. The instructions stored in the computer-readable memory constitute an article of manufacture including computer-readable instructions for implementing any and all of the depicted functions.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

The elements depicted in flowchart illustrations and block diagrams throughout the figures imply logical boundaries between the elements. However, according to software or hardware engineering practices, the depicted elements and the functions thereof may be implemented as parts of a monolithic software structure, as standalone software modules, or as modules that employ external routines, code, services, and so forth, or any combination of these. All such implementations are within the scope of the present disclosure.

Unless explicitly stated or otherwise clear from the context, the verbs "execute" and "process" are used interchangeably to indicate execute, process, interpret, compile, assemble, link, load, any and all combinations of the foregoing, or the like. Therefore, embodiments that execute or process computer program instructions, computer-executable code, or the like can suitably act upon the instructions or code in any and all of the ways just described.

The functions and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, embodiments of the invention are not described with reference to any particular programming language. It is appreciated that a variety of programming languages may be used to implement the present teachings as described herein, and any references to specific languages are provided for disclosure of enablement and best mode of embodiments of the invention. Embodiments of the invention are well suited to a wide variety of computer network systems over numerous topologies. Within this field, the configuration and management of large networks include storage devices and computers that are communicatively coupled to dissimilar computers and storage devices over a network, such as the Internet.

A number of implementations have been described. Nevertheless, it will be understood that various modifications may be made. For example, advantageous results may be achieved if the steps of the disclosed techniques were performed in a different sequence, or if components of the disclosed systems were combined in a different manner, or if the components were supplemented with other components. Accordingly, other implementations are contemplated within the scope of the following claims.

What is claimed is:

1. A material tracking process, comprising: configuring a container with a quantity sensor adapted to measure the quantity of a material in the container; configuring a user customizable interactive display to visually present as a function of time the material quantity relative to a predetermined threshold; determining the material quantity change within a predetermined time period based on captured sensor data; and, automatically presenting in the display the material quantity performance displayed as a function of time based on the material quantity change and the predetermined threshold.

2. The process of claim 1, wherein the predetermined threshold further comprises a goal.

3. The process of claim 1, wherein the material quantity performance further comprises consumption.

4. The process of claim 1, wherein the material quantity performance further comprises accumulation.

5. The process of claim 1, wherein the container further comprises a bottle.

6. The process of claim 1, wherein the container further comprises luggage selected from the group consisting of purse, tote, backpack, or lunchbox.

7. The process of claim 1, wherein the material further comprises a liquid material.

8. The process of claim 1, wherein the material further comprises a solid material.

9. The process of claim 1, wherein the quantity sensor further comprises a level sensor.

10. The process of claim 1, wherein the quantity sensor further comprises a weight sensor.

11. A material tracking apparatus, comprising: a container, configured to releasably retain material; a processor; a quantity sensor, operably coupled with the processor, wherein the quantity sensor is configured to provide data determined as a function of the quantity of material retained within the container; a user customizable, interactive display, operably coupled with the processor, wherein the display is configured to visually present as a function of time the material quantity change relative to a predetermined consumption goal; a memory that is not a transitory propagating signal, the memory operably and communicatively coupled with the processor and encoding computer readable instructions, including processor executable program instructions, the computer readable instructions accessible to the processor, wherein the processor executable program instructions, when executed by the processor, cause the processor to perform operations comprising: determine the material quantity change within a predetermined time period based on quantity sensor data; and, automatically present in the display the material quantity consumption performance displayed as a function of time based on the material quantity change and the predetermined consumption goal.

12. The apparatus of claim 11, wherein the display further comprises a plurality of human-visible indicators, wherein each indicator of the plurality of human-visible indicators is configured to display a plurality of distinct indications, and wherein each indication of the plurality of distinct indications visually encodes a predetermined material quantity consumption performance range.

13. The apparatus of claim 11, wherein the operations performed by the processor further comprise determine the material quantity change within each time period of a plurality of predetermined time periods.

14. The apparatus of claim 11, wherein the apparatus further comprises a base adapted to releasably couple with the container, and wherein the processor is configured in the base.

15. The apparatus of claim 14, wherein the display is configured in the base.

16. The apparatus of claim 11, wherein the display is configured in the container.

17. A material tracking apparatus, comprising: a container, configured to releasably retain material; a processor; a base adapted to releasably couple with the container, wherein the processor is configured in the base; a quantity sensor, operably coupled with the processor, wherein the quantity sensor is configured to provide data determined as a function of the quantity of material retained within the container; a user customizable, interactive display, operably coupled with the processor, wherein the display is configured in the base to visually present as a function of time the material quantity change relative to a predetermined consumption goal, wherein the display further comprises a plurality of user-visible lighting elements, wherein each lighting element of the plurality of lighting elements is configured to display a plurality of distinct indications, wherein each indication of the plurality of distinct indications comprises a visually distinct combination of color and intensity, and wherein each indication of the plurality of indications visually encodes a predetermined material quantity consumption performance range; a memory that is not a transitory propagating signal, the memory operably and communicatively coupled with the processor and encoding computer readable instructions, including processor executable program instructions, the computer readable instructions accessible to the processor, wherein the processor executable program instructions, when executed by the processor, cause the processor to perform operations comprising: determine the material quantity change within each time period of a plurality of predetermined time periods based on captured sensor data; and, automatically present in each display indicator the material quantity consumption performance determined as a function of one time period of the plurality of time periods based on the material quantity change in the one time period and the predetermined consumption goal.

18. The apparatus of claim 17, wherein the container further comprises a bottle.

19. The apparatus of claim 17, wherein the quantity sensor further comprises a weight sensor configured in the base.

20. The apparatus of claim 17, wherein the quantity sensor further comprises a level sensor configured in the container.

* * * * *